United States Patent
Landis et al.

(10) Patent No.: US 11,258,648 B1
(45) Date of Patent: Feb. 22, 2022

(54) CONSTELLATION DISTORTION INDICATION FOR SINGLE CARRIER WAVEFORM DIGITAL POST DISTORTION

(71) Applicant: QUALCOMM incorporated, San Diego, CA (US)

(72) Inventors: Shay Landis, Hod Hasharon (IL); Amit Bar-Or Tillinger, Tel-Aviv (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/212,715

(22) Filed: Mar. 25, 2021

(51) Int. Cl.
*H04L 27/34* (2006.01)
*H04L 27/36* (2006.01)
*H04W 76/27* (2018.01)
*H04W 72/04* (2009.01)
*H04L 27/38* (2006.01)

(52) U.S. Cl.
CPC ........ *H04L 27/3483* (2013.01); *H04L 27/368* (2013.01); *H04L 27/3863* (2013.01); *H04W 72/042* (2013.01); *H04W 76/27* (2018.02)

(58) Field of Classification Search
CPC ............... H04L 27/3483; H04L 27/368; H04L 27/3863; H04W 76/27; H04W 72/042
See application file for complete search history.

(56) References Cited

U.S. PATENT DOCUMENTS 9,553,754 B1 * 1/2017 Dorosenco ......... H04B 7/18517
11,038,739 B1 * 6/2021 Landis ................ H04B 1/1027

* cited by examiner

*Primary Examiner* — Nader Bolourchi
(74) *Attorney, Agent, or Firm* — Holland & Hart LLP

(57) ABSTRACT

Methods, systems, and devices for wireless communication are described. A communication device, such as a user equipment (UE) may receive control signaling (e.g., a downlink control information (DCI), a radio resource control (RRC) message, a medium access control-control element (MAC-CE)) including an indication of a set of constellation points for a set of constellation distortion points. The set of constellation distortion points may be of a constellation distribution associated with a modulation scheme (e.g., a quadrature amplitude modulation (QAM), an amplitude and phase-shift keying (APSK)). The UE may perform a digital post distortion operation based on the set of constellation points for the set of constellation distortion points of the constellation distribution, and decode the wireless communication based on performing of the digital post distortion operation.

30 Claims, 19 Drawing Sheets

CONSTELLATION DISTORTION INDICATION FOR SINGLE CARRIER WAVEFORM DIGITAL POST DISTORTION

FIELD OF TECHNOLOGY

The following relates to wireless communication, including constellation distortion indication for single carrier waveform digital post distortion.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to providing an indication related to distorted constellation points. For example, a receiving device (such as, a user equipment (UE)) may receive, from a transmitting device (such as, as a base station), an indication of a set of constellation points (also referred to as a set of center constellation points) for a set of constellation distortion points of a constellation distribution. The set of constellation points may represent more accurate (e.g., correct) locations for the set of constellation distortion points in the constellation distribution. The set of constellation distortion points may, in some examples, be due to nonlinear characteristics of one or more of the transmitting device or the receiving device. The indication may be provided to the receiving device via control signaling, such as in one or more of a downlink control information (DCI) message, a radio resource control (RRC) message, or a medium access control-control element (MAC-CE). Based on the indicated constellation points, the receiving device may effectively and efficiently perform digital post distortion and decode a modulated signal because the receiving device knows the location of the constellation points in the constellation distribution. The described techniques may also promote higher reliability and lower latency wireless communications, among other benefits.

A method for wireless communication at a UE is described. The method may include receiving control signaling including an indication of a set of constellation points for a set of constellation distortion points, the set of constellation distortion points of a constellation distribution associated with a modulation scheme, performing a digital post distortion operation based on the set of constellation points for the set of constellation distortion points of the constellation distribution, and decoding the wireless communication based on performing of the digital post distortion operation.

An apparatus for wireless communication at a UE is described. The apparatus may include a processor, memory coupled with the processor, and instructions stored in the memory. The instructions may be executable by the processor to cause the apparatus to receive control signaling including an indication of a set of constellation points for a set of constellation distortion points, the set of constellation distortion points of a constellation distribution associated with a modulation scheme, perform a digital post distortion operation based on the set of constellation points for the set of constellation distortion points of the constellation distribution, and decode the wireless communication based on performing of the digital post distortion operation.

Another apparatus for wireless communication at a UE is described. The apparatus may include means for receiving control signaling including an indication of a set of constellation points for a set of constellation distortion points, the set of constellation distortion points of a constellation distribution associated with a modulation scheme, means for performing a digital post distortion operation based on the set of constellation points for the set of constellation distortion points of the constellation distribution, and means for decoding the wireless communication based on performing of the digital post distortion operation.

A non-transitory computer-readable medium storing code for wireless communication at a UE is described. The code may include instructions executable by a processor to receive control signaling including an indication of a set of constellation points for a set of constellation distortion points, the set of constellation distortion points of a constellation distribution associated with a modulation scheme, perform a digital post distortion operation based on the set of constellation points for the set of constellation distortion points of the constellation distribution, and decode the wireless communication based on performing of the digital post distortion operation.

In some examples of the method, apparatuses, and non-transitory computer-readable medium described herein, performing the digital post distortion operation may include operations, features, means, or instructions for estimating a nonlinearity error of a power amplifier based on the set of constellation points for the set of constellation distortion points of the constellation distribution. In some examples of the method, apparatuses, and non-transitory computer-readable medium described herein, decoding the wireless communication may be based on the nonlinearity error of the power amplifier.

In some examples of the method, apparatuses, and non-transitory computer-readable medium described herein, receiving the control signaling may include operations, features, means, or instructions for receiving a DCI message including the indication of the set of constellation points for the set of constellation distortion points of the constellation distribution associated with the modulation scheme.

Some examples of the method, apparatuses, and non-transitory computer-readable medium described herein may further include operations, features, means, or instructions for determining an entry of a table that corresponds to the set of constellation distortion points of the constellation distribution associated with the modulation scheme based on the DCI message. In some examples of the method, apparatuses, and non-transitory computer-readable medium described herein, performing the digital post distortion operation may be based on determining the entry of the table that corresponds to the set of constellation distortion points of the constellation distribution associated with the modulation scheme.

Some examples of the method, apparatuses, and non-transitory computer-readable medium described herein may further include operations, features, means, or instructions for receiving one or more of an RRC message or a MAC-CE including a configuration of the table including the set of constellation distortion points of the constellation distribution associated with the modulation scheme. In some examples of the method, apparatuses, and non-transitory computer-readable medium described herein, determining the entry of the table that corresponds to the set of constellation distortion points of the constellation distribution associated with the modulation scheme may be based on one or more of the RRC message or the MAC-CE.

In some examples of the method, apparatuses, and non-transitory computer-readable medium described herein, receiving the control signaling may include operations, features, means, or instructions for receiving an RRC message including the indication of the set of constellation points for the set of constellation distortion points of the constellation distribution associated with the modulation scheme. In some examples of the method, apparatuses, and non-transitory computer-readable medium described herein, performing the digital post distortion operation may be based on the RRC message including the indication of the set of constellation points for the set of constellation distortion points of the constellation distribution.

In some examples of the method, apparatuses, and non-transitory computer-readable medium described herein, receiving the control signaling may include operations, features, means, or instructions for receiving a MAC-CE including the indication of the set of constellation points for the set of constellation distortion points of the constellation distribution associated with the modulation scheme. In some examples of the method, apparatuses, and non-transitory computer-readable medium described herein, performing the digital post distortion operation may be based on the MAC-CE including the indication of the set of constellation points for the set of constellation distortion points of the constellation distribution associated with the modulation scheme.

Some examples of the method, apparatuses, and non-transitory computer-readable medium described herein may further include operations, features, means, or instructions for receiving the control signaling including the indication of the set of constellation points for the set of constellation distortion points of the constellation distribution associated with the modulation scheme may be based on a power amplifier compression level.

Some examples of the method, apparatuses, and non-transitory computer-readable medium described herein may further include operations, features, means, or instructions for determining a set of constellation point offsets between a set of default constellation points and the set of constellation distortion points of the constellation distribution associated with the modulation scheme based on the indication, and determining the set of constellation points for the set of constellation distortion points of the constellation distribution based on the set of constellation point offsets. In some examples of the method, apparatuses, and non-transitory computer-readable medium described herein, performing the digital post distortion operation may be based on determining of the set of constellation points for the set of constellation distortion points of the constellation distribution.

In some examples of the method, apparatuses, and non-transitory computer-readable medium described herein, the set of constellation points for the set of constellation distortion points of the constellation distribution corresponds to a set of edge constellation points of the constellation distribution.

In some examples of the method, apparatuses, and non-transitory computer-readable medium described herein, the set of constellation points for the set of constellation distortion points of the constellation distribution corresponds to a set of radiuses of constellation points of the constellation distribution.

In some examples of the method, apparatuses, and non-transitory computer-readable medium described herein, the modulation scheme includes quadrature amplitude modulation (QAM) or amplitude and phase-shift keying (APSK) modulation.

In some examples of the method, apparatuses, and non-transitory computer-readable medium described herein, the wireless communication includes a single carrier waveform transmission.

A method for wireless communication at a base station is described. The method may include determining a set of constellation points for a set of constellation distortion points, the set of constellation distortion points of a constellation distribution associated with a modulation scheme and transmitting control signaling including an indication of the set of constellation points for the set of constellation distortion points.

An apparatus for wireless communication at a base station is described. The apparatus may include a processor, memory coupled with the processor, and instructions stored in the memory. The instructions may be executable by the processor to cause the apparatus to determine a set of constellation points for a set of constellation distortion points, the set of constellation distortion points of a constellation distribution associated with a modulation scheme and transmit control signaling including an indication of the set of constellation points for the set of constellation distortion points.

Another apparatus for wireless communication at a base station is described. The apparatus may include means for determining a set of constellation points for a set of constellation distortion points, the set of constellation distortion points of a constellation distribution associated with a modulation scheme and means for transmitting control signaling including an indication of the set of constellation points for the set of constellation distortion points.

A non-transitory computer-readable medium storing code for wireless communication at a base station is described. The code may include instructions executable by a processor to determine a set of constellation points for a set of constellation distortion points, the set of constellation distortion points of a constellation distribution associated with a modulation scheme and transmit control signaling including an indication of the set of constellation points for the set of constellation distortion points.

In some examples of the method, apparatuses, and non-transitory computer-readable medium described herein, transmitting the control signaling may include operations, features, means, or instructions for transmitting a DCI message including the indication of the set of constellation points for the set of constellation distortion points of the constellation distribution associated with the modulation scheme.

In some examples of the method, apparatuses, and non-transitory computer-readable medium described herein, transmitting the control signaling may include operations, features, means, or instructions for transmitting one or more of an RRC message or a MAC-CE including a configuration of a table including an entry of the set of constellation distortion points of the constellation distribution associated with the modulation scheme.

In some examples of the method, apparatuses, and non-transitory computer-readable medium described herein, transmitting the control signaling may include operations, features, means, or instructions for transmitting an RRC message including the indication of the set of constellation points for the set of constellation distortion points of the constellation distribution associated with the modulation scheme.

In some examples of the method, apparatuses, and non-transitory computer-readable medium described herein, transmitting the control signaling may include operations, features, means, or instructions for transmitting one or more of an RRC message or a MAC-CE including a configuration of a table including an entry of the set of constellation distortion points of the constellation distribution associated with the modulation scheme.

Some examples of the method, apparatuses, and non-transitory computer-readable medium described herein may further include operations, features, means, or instructions for transmitting the control signaling including the indication of the set of constellation points for the set of constellation distortion points of the constellation distribution associated with the modulation scheme may be based on a power amplifier compression level associated with the base station.

Some examples of the method, apparatuses, and non-transitory computer-readable medium described herein may further include operations, features, means, or instructions for determining a set of constellation point offsets between a set of default constellation points and the set of constellation distortion points of the constellation distribution associated with the modulation scheme, the indication indicates the set of constellation point offsets. In some examples of the method, apparatuses, and non-transitory computer-readable medium described herein, transmitting the control signaling includes and transmitting control signaling including the indication of the set of constellation points and the set of constellation point offsets for the set of constellation distortion points of the constellation distribution associated with the modulation scheme.

In some examples of the method, apparatuses, and non-transitory computer-readable medium described herein, the set of constellation points for the set of constellation distortion points of the constellation distribution corresponds to a set of edge constellation points of the constellation distribution.

In some examples of the method, apparatuses, and non-transitory computer-readable medium described herein, the set of constellation points for the set of constellation distortion points of the constellation distribution corresponds to a set of radiuses of constellation points of the constellation distribution.

In some examples of the method, apparatuses, and non-transitory computer-readable medium described herein, the modulation scheme includes QAM or APSK modulation.

In some examples of the method, apparatuses, and non-transitory computer-readable medium described herein, the wireless communication includes a single carrier waveform transmission.

DETAILED DESCRIPTION

Figure 1:
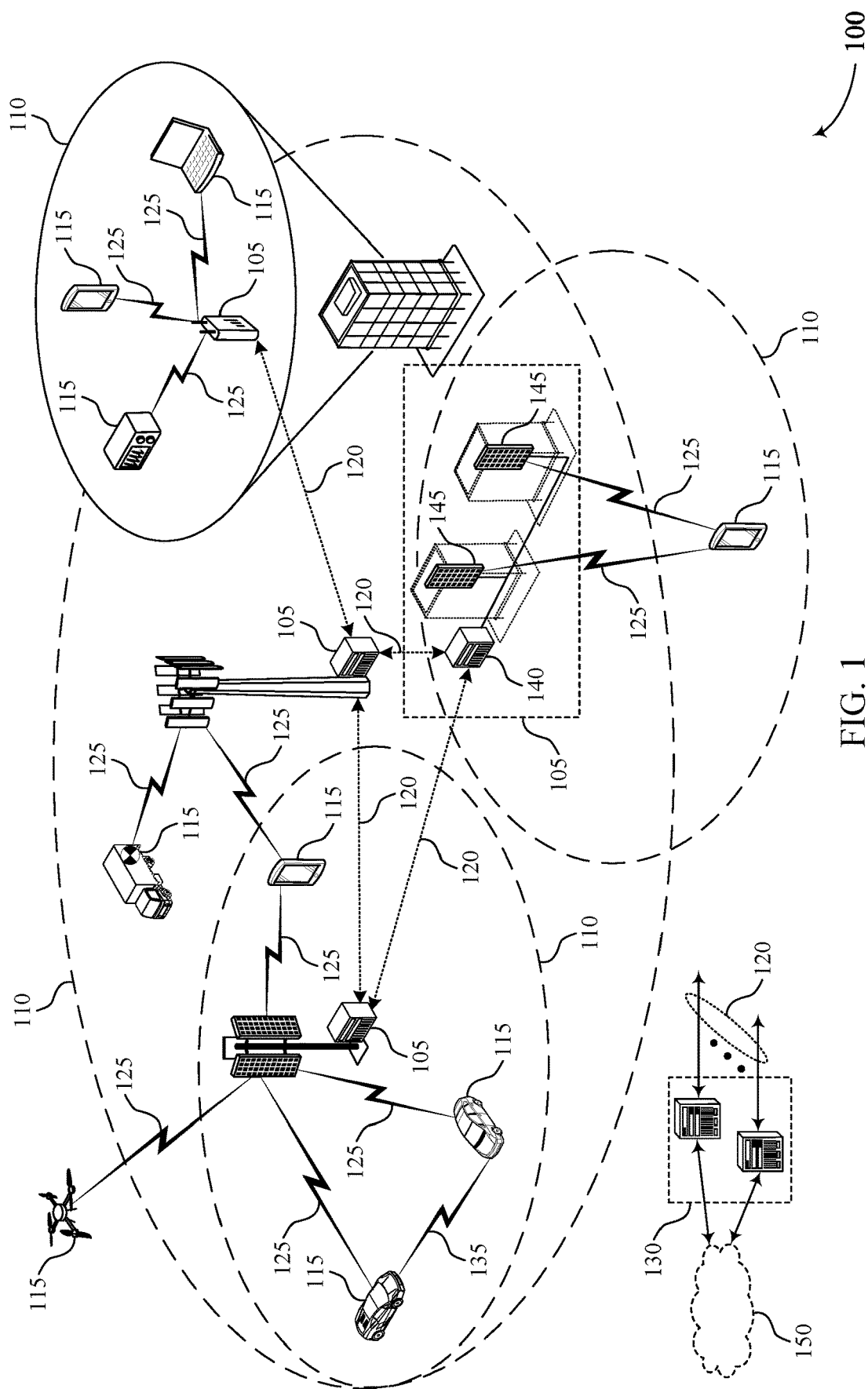
FIGS. 1 and 2 illustrate examples of wireless communications systems that support constellation distortion indication for single carrier waveform digital post distortion in accordance with aspects of the present disclosure.

A wireless communications system may include various communication devices, such as a user equipment (UE) and a base station. The wireless communications system, in some examples, may support multiple radio access technologies including fourth generation (4G) systems, such as 4G Long-Term Evolution (LTE), as well as fifth generation (5G) systems, which may be referred to as 5G new radio (NR). In the wireless communications system, a transmitting device (such as, a base station) may transmit a modulated signal to a receiving device (such as, a UE). The base station may generate a carrier signal (e.g., an unmodulated waveform), modulate the carrier signal with information via a modulation scheme (e.g., a quadrature amplitude modulation (QAM), amplitude and phase-shift keying (APSK)), and transmit the modulated signal to the UE.

The modulation scheme may include using a number of symbols, which may be used to convey information to the UE. These symbols may be mapped to a discrete set of magnitude and phase values on a constellation distribution (which may also be referred to as a constellation diagram), which are referred to as constellation points. The base station may receive the modulated signal and extract the information from the signal, for example, using digital post distortion operations on the signal in accordance with the constellation distribution. If possible, the base station may transmit the modulated signal with constellation points at correct constellation point locations on the constellation diagram. However, various imperfections such as distortion and impairments (e.g., due to nonlinearities of a power amplifier) may distort the constellation points such that they are positioned out of the correct constellation point locations, resulting in reduced reliability of demodulating the modulated signal at the UE.

Various aspects of the present disclosure relate to providing, by the base station, an indication of the distorted constellation points, to the UE. For example, the UE may receive, from the base station, an indication of a set of constellation points for a set of constellation distortion points of a constellation distribution. The indication may be provided to the UE via control signaling, such as an in a downlink control information (DCI) message, a radio resource control (RRC) message, or a medium access control-control element (MAC-CE). Based on the indicated constellation points, the UE may effectively and efficiently perform digital post distortion and decode a modulated signal because the UE may know the correct (e.g., more accurate) location of the constellation points in the constellation distribution.

Aspects of the subject matter described in this disclosure may be implemented to realize one or more of the following potential improvements, among others. The techniques employed by the UE may provide benefits and enhancements to the operation of the UE. For example, operations performed by the UE may provide improvements to demodulation and decoding techniques. By using non-distorted constellation points when performing digital post distortion, the UE may experience increased reliability and efficiency of demodulating and decoding a signal from the base station.

Aspects of the disclosure are initially described in the context of wireless communications systems. Aspects of the disclosure are further illustrated by and described with reference to apparatus diagrams, system diagrams, and flowcharts that relate to constellation distortion indication for single carrier waveform digital post distortion.

FIG. 1 illustrates an example of a wireless communications system 100 that supports constellation distortion indication for single carrier waveform digital post distortion in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may generate a carrier signal, such as a single carrier waveform, to transmit data to a UE 115. The base station 105 may modulate the single carrier waveform according to a modulation scheme, such as (QAM, APSK, or any other modulation scheme). The modulation scheme may be associated with a constellation diagram (e.g., a constellation distribution) that may include multiple sets of constellation points, where each set of constellation points may have a center of mass (e.g., a center of a constellation distribution). A modulation scheme may involve a discrete number of symbols, which are used to convey information. These symbols are mapped to a discrete set of magnitude and phase values referred to as constellation points on an I/Q plane referred to as the constellation diagram (constellation distribution). The constellation diagram is useful to the base station 105 and the UE 115 because it models both the ideal signal and the actual measured signal. The ideal constellation point locations in the constellation diagram are predefined depending on the modulation scheme as described with reference to FIGS. 3 and 4.

The base station 105 may compress the modulated signal using a power amplifier, which may create distortion of the signal and generate non-linear noise. The non-linear noise may be removed at the UE 115 upon receiving the modulated signal, by applying a digital post distortion algorithm to the modulated signal. The digital post distortion algorithm may be applied in multiple iterations, where each iteration estimates and removes more and more of the non-linearity from the received signal. However, the digital post distortion algorithm may apply hard decision slicing to the modulated signal. In some cases, the UE 115 may perform a hard decision based on comparing the symbols from the received signal to a set of default centers of mass of a set of constellation points associated with the modulation scheme used to modulate the received signal. The default centers of mass may not take into account the distortion created by the power amplifier, therefore, when comparing the symbols of the received signal, the symbols may not fall within a decision boundary of a correct default center of mass. The number of slicing errors may increase, which may negatively affect the non-linear estimation results of the digital post distortion algorithm.

In order to decrease the number of slicing errors that may occur in initial iterations of applying the digital post distortion algorithm, the base station 105 may compensate for the distortion caused by compression at the power amplifier by transmitting an indication of the distorted centers of mass for each of the sets of constellation distortion points after compression at the power amplifier occurs. The UE 115 may utilize the indicated distorted centers of mass when applying hard decision slicing, which may reduce the number of slicing errors and improve the digital post distortion algorithms ability to estimate the non-linearity, thereby improving signal modulation and decoding in the wireless communications system 100.

Figure 2:
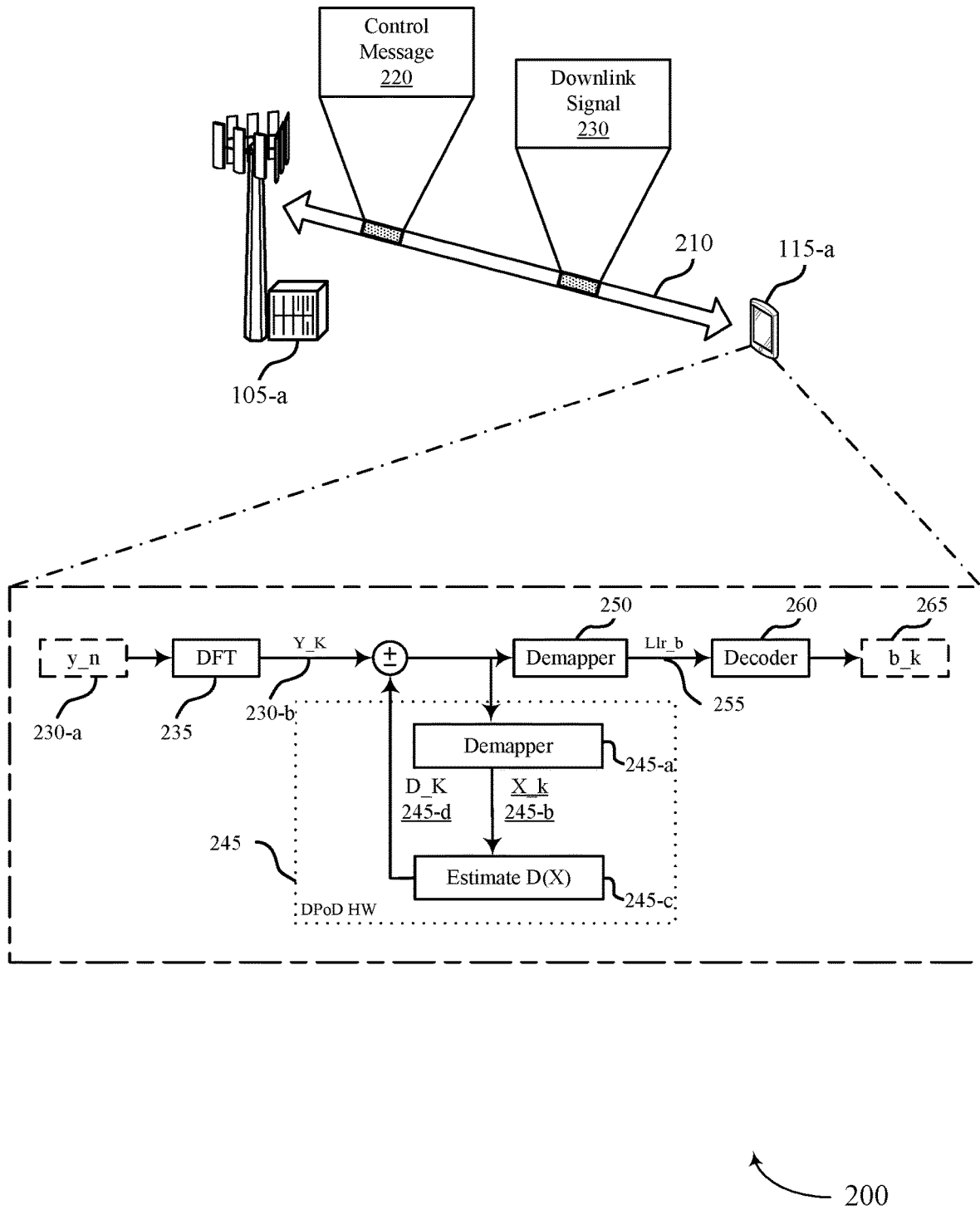

FIG. 2 illustrates an example of a wireless communications system 200 that supports constellation distortion indication for single carrier waveform digital post distortion in accordance with aspects of the present disclosure. In some examples, the wireless communications system 200 may implement aspects of the wireless communications system 100 or may be implemented by aspects of the wireless communications system 100. For example, the wireless communications system 200 may include a base station 105-a and a UE 115-a. The base station 105-a and the UE 115-a may be examples of corresponding devices described herein with reference to FIG. 1.

In some examples, the wireless communications system 200 may support multiple radio access technologies including 4G systems such as LTE systems, LTE-A systems, or LTE-A Pro systems, and 5G systems, which may be referred to as NR systems. The wireless communications system 200 may also support improvements to power consumption, spectral efficiency, higher data rates and, in some examples, may promote enhanced efficiency for higher reliability and lower latency wireless communications (e.g., uplink transmission, downlink transmission, uplink reception, and downlink reception), among other benefits.

Figure 3:
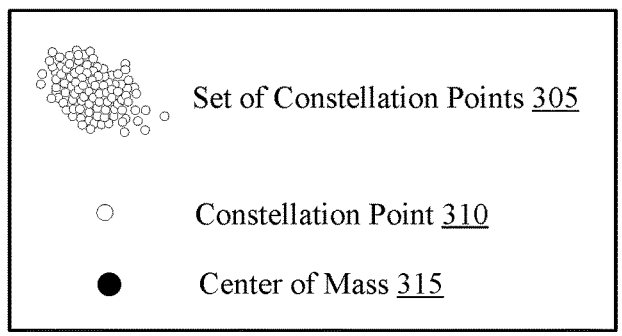
FIGS. 3 and 4 illustrate example of constellation diagrams that support constellation distortion indication for single carrier waveform digital post distortion in accordance with aspects of the present disclosure.
Figure 3:
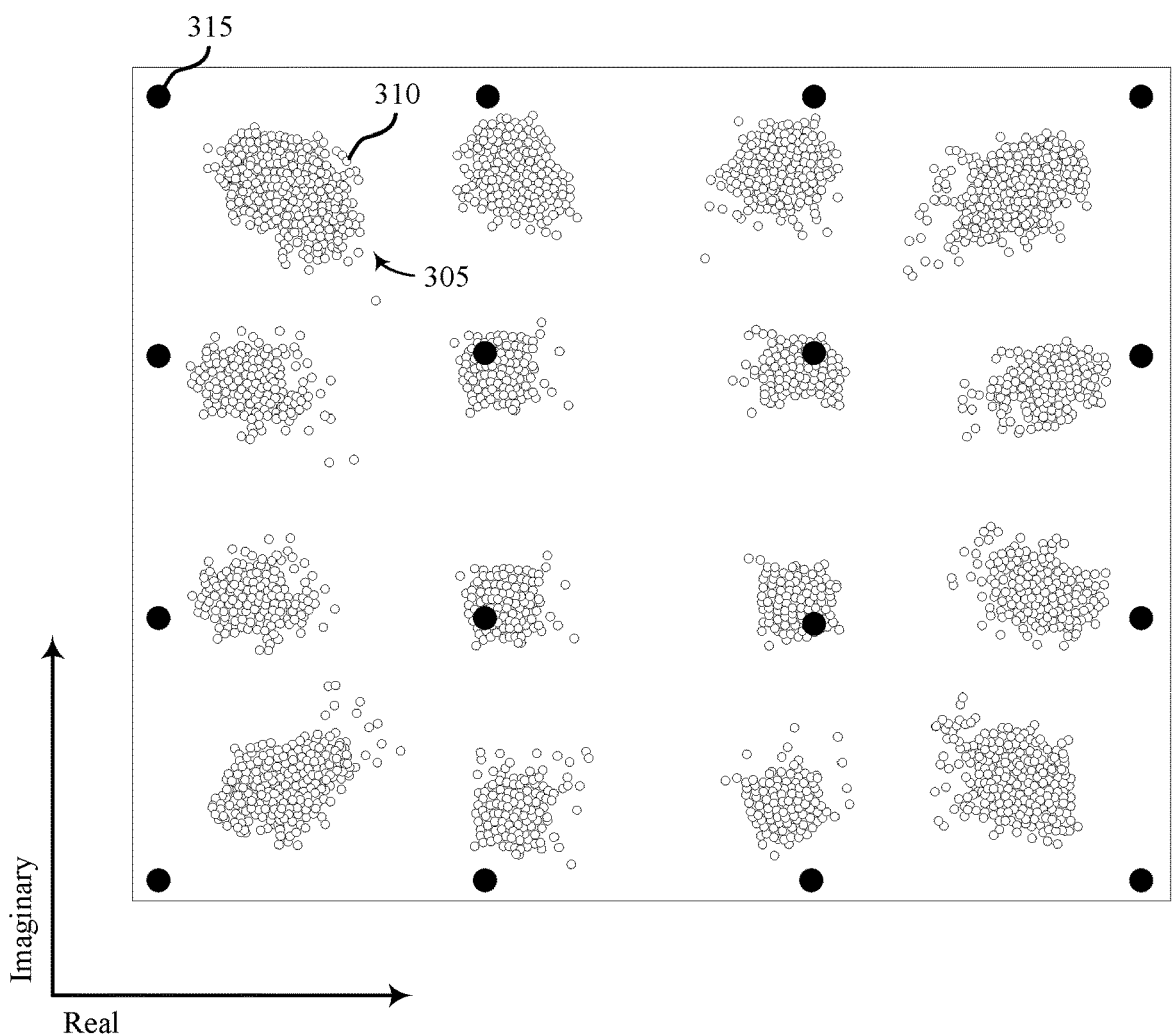
Figure 4:
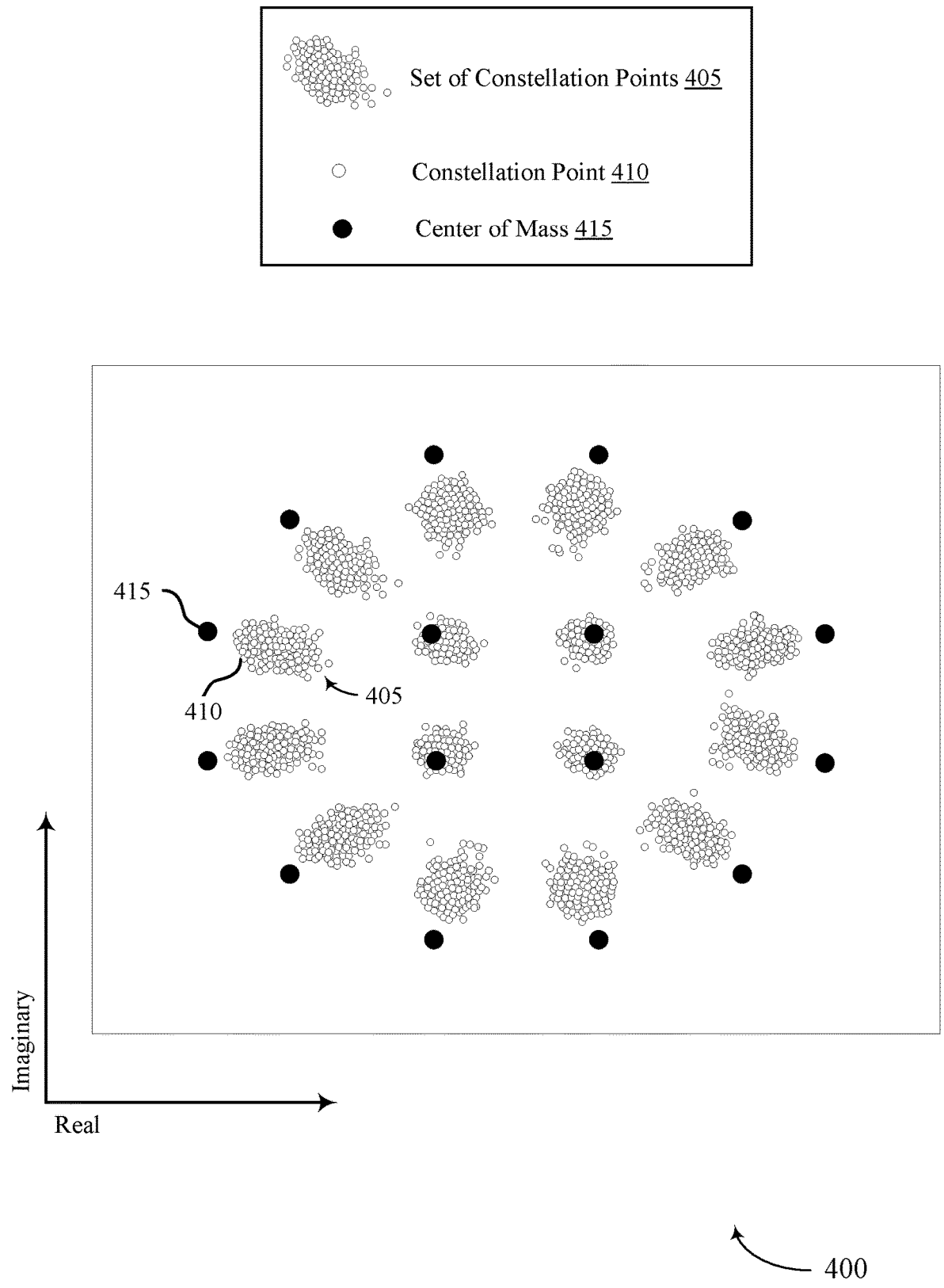

In the example of FIG. 2, a transmitting device (such as, the base station 105-a) may transmit data to a receiving device (such as, the UE 115-a) over a communication link 210, which may be an example of a communication link described herein with reference to FIG. 1. In order to transmit the data, the base station 105-a may generate a carrier signal (e.g., an unmodulated waveform), and in higher frequency bands (e.g., FR4, FR5), a single carrier waveform may be used due to its lower complexity and resilience to phase noise. The base station 105-a may modulate the carrier signal (e.g., single carrier waveform) with information via a modulation scheme (e.g., a QAM or an APSK, or any other modulation scheme), to produce a downlink signal 230 (e.g., a modulated signal). The modulation scheme may include using a number of symbols, which are used to convey the data to the UE 115-a. These symbols may be mapped to a discrete set of magnitude and phase values on a constellation distribution (also referred to as a constellation diagram, examples of which are shown in FIGS. 3 and 4).

Ideally, the base station 105-a may transmit the modulated signal with constellation points at ideal constellation point locations of a constellation distribution that may be free from any imperfections, such as distortion and impairments. The ideal constellation point locations may be clustered around a center of mass for each set of constellation points (also referred to as a set of centered constellation points) of the constellation distribution. However, before the base station 105-a transmits the downlink signal 230 to the UE 115-a, the base station 105-a may amplify the downlink signal 230 using a power amplifier. As the power amplifier nears saturation, this may result in a distortion that may generate non-linear noise according to a known model (e.g., power amplifier clipping), by directly affecting the mapped symbols of downlink signal 230. Thus, the centers of mass of the constellations of the amplified downlink signal 230 may differ from the ideal constellation point locations due to distortion.

The base station 105-a may remove the non-linear noise from the downlink signal 230. In some other cases, the UE 115-a may remove the non-linear noise from the downlink signal 230. For example, the UE 115-a may apply a digital post distortion algorithm 245 to the received downlink signal 230 to remove the non-linear noise from the downlink signal 230. The digital post distortion algorithm 245 may be represented by Equation (1):

$$Y_k = G(X_k) + N_k = \alpha \cdot X_k + D(X_k) + N_k \qquad (1)$$

where $\alpha$ may be a coefficient, such as a Bussgang coefficient, $X_k$ may be the downlink signal 230, and k may be a delay or time offset as a result of the distortion introduced by the power amplifier. The $\alpha \cdot X_k$ part of the Equation (1) may be a linear portion of the downlink signal 230 and may represent the downlink signal 230 before non-linear noise may have been introduced, for example, by the power amplifier at the base station 105-a. The non-linear model that results from the downlink signal 230 may be represented by D ($X_k$) in the time domain. The non-linear model D ($X_k$) may include odd-order memoryless kernels, such as $x^*|x|^2$ or $x*|x|^4$, that may represent the power amplifier used at the base station 105-*a* to amplify the downlink signal 230. As such, $Y_k$ may represent the non-linearity of the signal $X_k$, which may equate to the sum of the applied kernels, where each kernel has its own coefficient. In some cases, such as large bandwidth or high signal to noise ratio (SNR), memory kernels may also be applied, such as $x[n]*|x[n-k]|^M$ where k may be a time delay and M may be an even integer.

The UE 115-*a* may apply the digital post distortion algorithm 245 to the downlink signal 230 one or more times, where each iteration includes performing a hard decision slicing operation 245-*a* and estimating the non-linearity 245-*c* (e.g., estimate D(X)). In order to perform the hard decision slicing operation 245-*a*, the UE 115-*a* may take the time domain signal 230-*a* (e.g., y_n) of the downlink signal 230 and apply demodulation operation 235 (e.g., a DFT) in order to produce the demodulated downlink signal 230-*b*. The UE 115-*a* may perform the hard decision slicing operation 245-*a* on the demodulated downlink signal 230-*b* by comparing each symbol of the demodulated downlink signal 230-*b* to constellations in a constellation distribution that may be free of impairments and based on the modulation scheme used to modulate the downlink signal 230 at the base station 105-*a*, as further described with reference to FIGS. 3 and 4.

For each received symbol of downlink signal 230, the UE 115-*a* may determine which constellation point on the constellation distribution the received symbol may be closest to and select the symbol mapped to that constellation point as the received symbol for downlink signal 230. That is, the UE 115-*a* may determine that the location of the constellation point closest to the received symbol is the symbol the base station 105-*a* may have used when modulating the signal before transmission. However, the constellation distribution may be free of impairments such as errors or distortions, which may result in slicing errors and incorrect symbol selection since the downlink signal 230 may be affected by non-linear noise at the symbol level.

Therefore, the base station 105-*a* may determine new centers of mass (e.g., distortion centers of mass) for one or more distortion constellations of the set of constellations in the constellation distribution. The distortion centers of mass may account for the distortion introduced as a result of the impairments generated by the power amplifier (e.g., non-linearity), since the distortion centers of mass may be determined after the power amplifier compression has been applied to the downlink signal 230. The base station 105-*a* may transmit control signaling 220 that indicates the one or more distortion centers of mass (e.g., the set of constellation points) of the one or more distortion constellations (e.g., the set of constellation distortion points) to the UE 115-*a*. The UE 115-*a* may use the set of distortion centers of mass when applying the hard decision slicing operation 245-*a* to demodulated downlink signal 230-*b*. For example, the UE 115-*a* may compare the received symbols of the downlink signal 230 to the set of distortion centers of mass of the distorted constellations. This may result in less slicing errors since in early iterations the set of constellation distortion points may more closely align with the symbols of the received downlink signal 230.

The base station 105-*a* may transmit the indication of the set of distortion centers of mass (e.g., the set of constellation points) via the control signaling 220 such as, DCI, MAC-CE, RRC, or any other control signaling. In the case of DCI, the indication may be included in a DCI message and may indicate a table of possible constellation distributions. The table may be predefined, or the table may be configured via an RRC configuration or a MAC-CE. For example, a different table may be indicated based on different distortion levels. In the case of the MAC-CE and the RRC configuration, the base station 105-*a* may indicate constellation distortion details via the MAC-CE or the RRC configuration if the base station 105-*a* determines that the power amplifier model isn't frequently changing.

The constellation distortion details may include an offset (e.g., a delta) between the centers of mass of the constellations of a default constellation distribution and the distortion centers of mass, an amplitude, a phase, or any other adjustment. The indication may also depend on the temperature at the power amplifier, the compression level used by the power amplifier, changes at the power amplifier over time, or any combination thereof. For example, different compression levels may indicate different kernels and different coefficients. These different compression levels may indicate different tables of constellation distributions. In other examples, a temperature change at the power amplifier may also change the distortion, for example if the base station 105-*a* enters a high duty cycle the temperature at the base station 105-*a* may become warmer and thus change the distortion produced by the power amplifier. In another example, the power amplifier or the base station 105-*a* may change its properties over time, which may also affect the distortion. In some cases, the UE 115-*a* may indicate to the base station 105-*a* that it has the capability to use the distortion center of mass information, which may prevent the base station 105-*a* from transmitting information needlessly. In other cases, the UE 115-*a* may determine that the distortion has satisfied a threshold and therefore, may send a request to the base station 105-*a* to receive the indication of distortion centers of mass.

Based on the UE 115-*a* receiving the control signaling 220, the UE 115-*a* may use the one or more indicated distortion centers of mass of constellations instead of the default centers of mass of constellations of the default constellation diagram for the hard decision slicing operation 245-*a*. This may reduce the number of slicing errors and produce a more accurate reconstruction of the downlink signal 230 before compression was applied by the power amplifier at the base station 105-*a*. This may result in the signal 245-*b*, which may be the reconstruction of the pre-compressed downlink signal 230. The signal 245-*b* may then be used in estimating the non-linearity operation 245-*c*. The non-linear model D(Xk) may take the time domain signal 245-*b* as input and output an estimated non-linearity error 245-*d* (e.g., D_K) in the frequency domain. The estimated non-linearity error 245-*d* may then be removed from the demodulated downlink signal 230-*b*. A demapping operation 250 may be applied to the error corrected signal resulting in the log-likelihood ratio 255, which may act as input to decoder 260 and finally result in signal 265 (e.g., b_k), which may be the error corrected and decoded downlink signal 230.

FIG. 3 illustrates an example of a constellation diagram 300 that supports constellation distortion indication for single carrier waveform digital post distortion in accordance with aspects of the present disclosure. The constellation diagram 300 may implement aspects of the wireless communications systems 100 and 200 or may be implemented by aspects of the wireless communications systems 100 and 200 as described with reference to FIGS. 1 and 2, respectively. For example, the constellation diagram 300 may be implemented by a UE 115 to support digital post distortion to increase demodulation and decoding performance at the UE 115. The constellation diagram 300 may further be implemented by a UE 115 to provide improvements to demodulation and decoding reliability, power consumption, and signal processing capability, among other benefits.

For example, the constellation diagram 300 may be implemented by a UE 115 that may be in communication with a base station 105. The base station 105 may transmit control signaling to the UE 115 that may include an indication of a set of distortion centers of mass (e.g., a set of constellation points for a set of constellation distortion points), such as centers of mass of a sets of constellation distortion points 305. For example, the base station 105 may generate a carrier signal, such as a single carrier waveform, and apply a modulation scheme to the single carrier waveform, such as 16 QAM. The constellation diagram 300 (e.g., constellation distribution) may be associated with the 16 QAM modulation scheme. In the example of the constellation diagram 300, which may be based on 16 QAM, the 16 centers of mass 315 may correspond to 16 amplitude and phase states that symbols of the single carrier waveform may be mapped to (e.g., modulated into). The centers of mass 315 may represent the default centers of mass 315 (e.g., ideal centers of mass) for a default set of constellation points that may represent ideal constellation point locations on the constellation diagram 300 for a particular modulation scheme (e.g., 16 QAM).

In some cases, the base station 105 may amplify the signal before transmitting it to the UE 115, and therefore the signal may pass through a power amplifier. The power amplifier may introduce a distortion to the signal that may result in non-linear noise affecting the signal. This may result in sets of constellation distortion points 305, where the constellation points 310 may be loosely clustered around a distorted center of mass for each set of constellation distortion points 305. The distorted centers of mass for each set of constellation distortion points 305 may be offset (e.g., by a bias) from the default centers of mass 315 due to the distortion introduced by the power amplifier.

The UE 115 may perform a digital post distortion algorithm on the received signal in order to remove the non-linear noise generated by the power amplifier. As part of the digital post distortion algorithm, the UE 115 may apply hard decision slicing to the symbols of the received signal. Based on the default centers of mass 315, the symbols of the received signal may not fall within the correct decision boundaries of the default centers of mass 315 since the default centers of mass 315 may not take into account the distortion introduced by the power amplifier. This may result in an increase in slicing errors where sliced symbols may not be modulated into the correct amplitude and phase state. That is, multiple symbols of the received signal may be modulated into a different amplitude and phase state than the same symbol was modulated into when the base station 115 first applied the modulation scheme to the signal.

The base station 105 may compensate for the distortion caused by the amplifier by indicating to the UE 115, a set of distorted centers of mass for the sets of constellation distortion points 305. The UE 115 may use the indicated set of distorted centers of mass when performing the digital post distortion algorithm. For example, when applying hard decision slicing to the signal, the symbols of the received signal may fall within a decision boundary of the correct distorted center of mass since the distorted centers of mass may have compensated for the distortion introduced by the power amplifier. The symbols of the received signal may be modulated into the correct amplitude and phase state. The initial iterations of the digital post distortion algorithm may produce fewer slicing errors since the indicated set of distorted centers of mass may take into account the distortion generated by the power amplifier at the base station 105.

In some cases, the base station 105 may indicate the distorted centers of mass only for the edge sets of constellation distortion points 305. This may be due to the fact that the edge sets of constellation distortion points 305 may have the higher energy and therefore result in larger offsets between the default centers of mass 315 and the centers of mass of the sets of constellation distortion points 305. The inner sets of constellation distortion points 305 may have lower energy, and therefore the offset may not be as big. In other cases, the sets of constellation distortion points 305 may be grouped based on symmetry, where the base station 105 indicates distorted centers of mass for sets of constellation distortion points 305 that may be symmetric since the offsets may be similar.

FIG. 4 illustrates an example of a constellation diagram 400 that supports constellation distortion indication for single carrier waveform digital post distortion in accordance with aspects of the present disclosure. The constellation diagram 400 may implement aspects of the wireless communications systems 100 and 200 or may be implemented by aspects of the wireless communications systems 100 and 200 as described with reference to FIGS. 1 and 2, respectively. For example, the constellation diagram 400 may be implemented by a UE 115 to support digital post distortion to increase demodulation and decoding performance at the UE 115. The constellation diagram 400 may further be implemented by a UE 115 to provide improvements to demodulation and decoding reliability, power consumption, and signal processing capability, among other benefits.

The constellation diagram 400 may be implemented by a UE 115 that may be in communication with a base station 105, similarly described with reference to FIG. 3. The base station 105 may transmit control signaling to the UE 115 that may include an indication of a set of distortion centers of mass (e.g., a set of constellation points for a set of constellation distortion points), such as the centers of mass of the sets of constellation distortion points 405. For example, the base station may generate a carrier signal, such as a single carrier waveform, and apply a modulation scheme to the single carrier waveform, such as 16 APSK. A constellation diagram 400 (e.g., constellation distribution), may be associated with the modulation scheme. In the example of constellation diagram 400, which may be based on 16 APSK, the 16 centers of mass 415 may include one or more rings of sets of constellation points 410. The centers of mass 415 may represent the default centers of mass 415 (e.g., ideal centers of mass) for a default set of constellation points that may represent ideal constellation point locations on the constellation diagram 400 for a particular modulation scheme (e.g., 16 APSK).

The base station 105 may compensate for distortion caused by compression at the power amplifier by determining a set of distorted centers of mass for the sets of constellation distortion points 405 after the power amplifier compression. The base station 105 may transmit control signaling to the UE 115 indicating the set of distorted centers of mass. In some cases, an APSK modulation scheme may be applied to the signal. In the case of APSK, the set of distorted centers of mass may be indicated by a radius of the sets of constellation distortion points 405. For example, the base station 105 may determine an offset (e.g., delta) between the default centers of mass 415 and the distorted centers of mass, along a radius of the one or more rings.

The base station 105 may transmit the delta associated with a radius of a ring formed by the sets of constellation points 410 since the deltas of sets of constellation distortion points 405 along a ring may be symmetrical. The UE 115 may use the indicated set of distorted centers of mass to perform a digital post distortion algorithm, including hard decision slicing of the symbols of the received signal. This may result in less slicing errors and a more accurate estimation of the non-linearity introduced by the compression at the power amplifier. The UE 115 may remove the non-linearity of the received signal based on the digital post distortion algorithm and decode the received signal.

Figure 5:
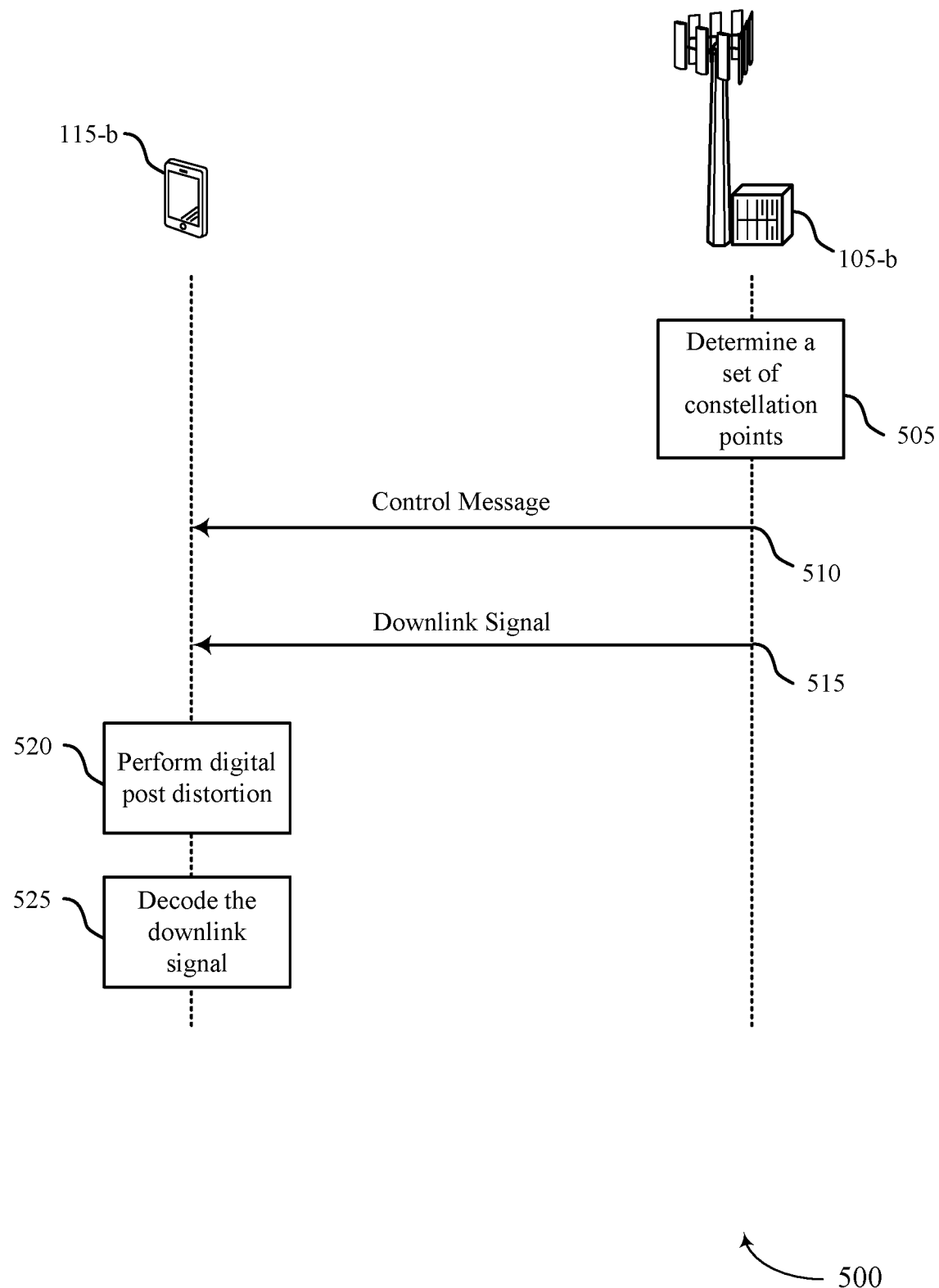
FIG. 5 illustrates an example of a process flow that supports constellation distortion indication for single carrier waveform digital post distortion in accordance with aspects of the present disclosure.

FIG. 5 illustrates an example of a process flow 500 that supports constellation distortion indication for single carrier waveform digital post distortion in accordance with aspects of the present disclosure. The process flow 500 may implement aspects of the wireless communications systems 100 and 200 or may be implemented by aspects of the wireless communications systems 100 and 200 as described with reference to FIGS. 1 and 2, respectively. For example, the process flow 500 may be based on a configuration by a base station 105-*b*, which may be implemented by a UE 115-*b*. The base station 105-*b* and the UE 115-*b* may be examples of a base station 105 and a UE 115, as described with reference to FIGS. 1 and 2.

The process flow 500 may be implemented by the UE 115-*b* to support digital post distortion to increase demodulation and decoding performance at the UE 115-*b*. The process flow 500 may further be implemented by the UE 115-*b* to provide improvements to demodulation and decoding reliability, power consumption, and signal processing capability, among other benefits. In the following description of the process flow 500, the operations may be performed in different orders or at different times. Some operations may also be omitted from the process flow 500, and other operations may be added to the process flow 500.

At 505, the base station 105-*b* may determine a set of constellation points (e.g., a set of distortion centers of mass) for a set of constellation distortion points of a constellation distribution associated with a modulation scheme. The modulation scheme may be a modulation scheme (e.g., a 16 QAM, a 16 APSK, or any other modulation scheme). The base station 105-*b* may use to modulate a single carrier waveform to generate a downlink signal that may be transmitted to the UE 115-*b*. In some cases, the base station 105-*b* may determine a set of constellation point offsets (e.g., deltas) between a set of default constellation points and the set of constellation distortion points. The base station 105-*b* may determine the set of constellation points for the set of constellation distortion points based on the determined set of constellation point offsets. In other cases, the set of constellation points for the set of constellation distortion points may correspond to a set of edge constellation points of the constellation distribution.

For example, a constellation distribution based on a QAM modulation scheme may generate edge constellation points at lower energy, and therefore, the offset between the set of constellation distortion points and the default constellation points may be relatively large for the edge constellation points compared to inner constellation points. In another example, a constellation distribution based on an APSK modulation scheme may generate one or more radiuses of constellation points. The offset between a radius of constellation points and a radius of constellation distortion points may be relatively similar amongst the constellation points that make up the radius. Therefore, the set of constellation points for the set of constellation distortion points may correspond to a set of radiuses of constellation points.

At 510, the base station 105-*b* may transmit a control message to the UE 115-*b* that may indicate the determined set of constellation points (e.g., a set of distortion centers of mass) for the set of constellation distortion points of a constellation distribution associated with a modulation scheme. In some cases, the control message may be a DCI message and may indicate the set of constellation points for the set of constellation distortion points. The DCI message may also indicate an entry in one or more tables that may correspond to the set of constellation distortion points of the constellation distribution associated with the modulation scheme that may be used for a downlink signal. Additionally or alternatively, the one or more tables may be configured by a received MAC-CE or a received RRC message.

In other cases, the control message may be a MAC-CE or an RRC message that may indicate the set of constellation points for the set of constellation distortion points. For example, a MAC-CE or an RRC message may include an indication such as the offset between the set of constellation distortion points and the set of default constellation points. In some cases, such as for QAM modulation schemes, the offset may be indicated based on groups of symmetric constellations where the offset may be similar for the constellations within the group. In other cases, such as an APSK modulation scheme, the delta may indicate an offset for constellations in a radius since the offsets may be similar amongst the constellations within the radius.

The base station 105-*b* may transmit the indication to the UE 115-*b* based on multiple factors, such as the power amplifier compression level at the base station 105-*b*, the temperature at the base station 105-*b*, changes to the base station 105-*b* over time, or any other factors that may affect the distortion. The base station 105-*b* transmitting the indication may also depend upon signaling from the UE 115-*b*. For example, the UE 115-*b* may indicate to the base station 105-*b* that it has the capability to utilize the indicated set of constellation points. In another example, the UE 115-*b* may determine that a distortion level satisfies a threshold and therefore the UE 115-*b* may transmit a request to the base station 105-*b* for the set of constellation points.

At 515, the base station 105-*b* may transmit a downlink signal (e.g., a physical downlink control channel (PDSCH) transmission) to the UE 115-*b*. The downlink signal may be a modulated single carrier waveform where the base station 105-*b* modulates the single carrier waveform based on a modulation scheme associated with a constellation distribution. In some cases, the downlink signal may include a non-linearity error that may be removed by the UE 115-*b*. At 520, the UE 115-*b* may perform a digital post distortion on the received downlink signal as described in further detail with reference to FIG. 2. The digital post distortion may use the indication received in the control message from the base station 105-*b* to determine the set of constellation points for the set of constellation distortion points of a constellation distribution associated with the modulation scheme used to modulate the downlink signal. Once the UE 115-*b* determines the set of constellation points, the UE 115-*b* may utilize the set of constellation points when applying the digital post distortion algorithm. For example, the UE 115-*b* may use the determined set of constellation points instead of the default constellation points during hard decision slicing of symbols of the downlink signal. As a result, slicing errors may be reduced and the outputted sliced symbols may be used as input to a non-linear model.

The non-linear model may estimate a non-linearity error of a power amplifier by applying memoryless kernels to the sliced symbols in order to estimate the non-linearity produced by the power amplifier. The UE 115-*b* may subtract the non-linearity from the downlink signal in order to generate a downlink signal without the non-linear noise and distortion. That is, the UE 115-*b* may repeat the digital post distortion algorithm, including the hard decision slicing and applying the non-linear model to the sliced symbols, until the non-linearity error may be reduced to a minimum value, the constellation distribution of the error corrected signal may converge with the default constellation distribution, the set of constellation point offsets may be reduced to a minimum threshold, or any combination thereof. Thus, the UE 115-*b* may perform multiple iterations of the digital post distortion algorithm until the non-linearity is removed. At 525, the UE 115-*b* may decode the downlink signal with the non-linear noise removed based on the non-linearity error of the power amplifier and performing the digital post distortion algorithm.

Figure 6:
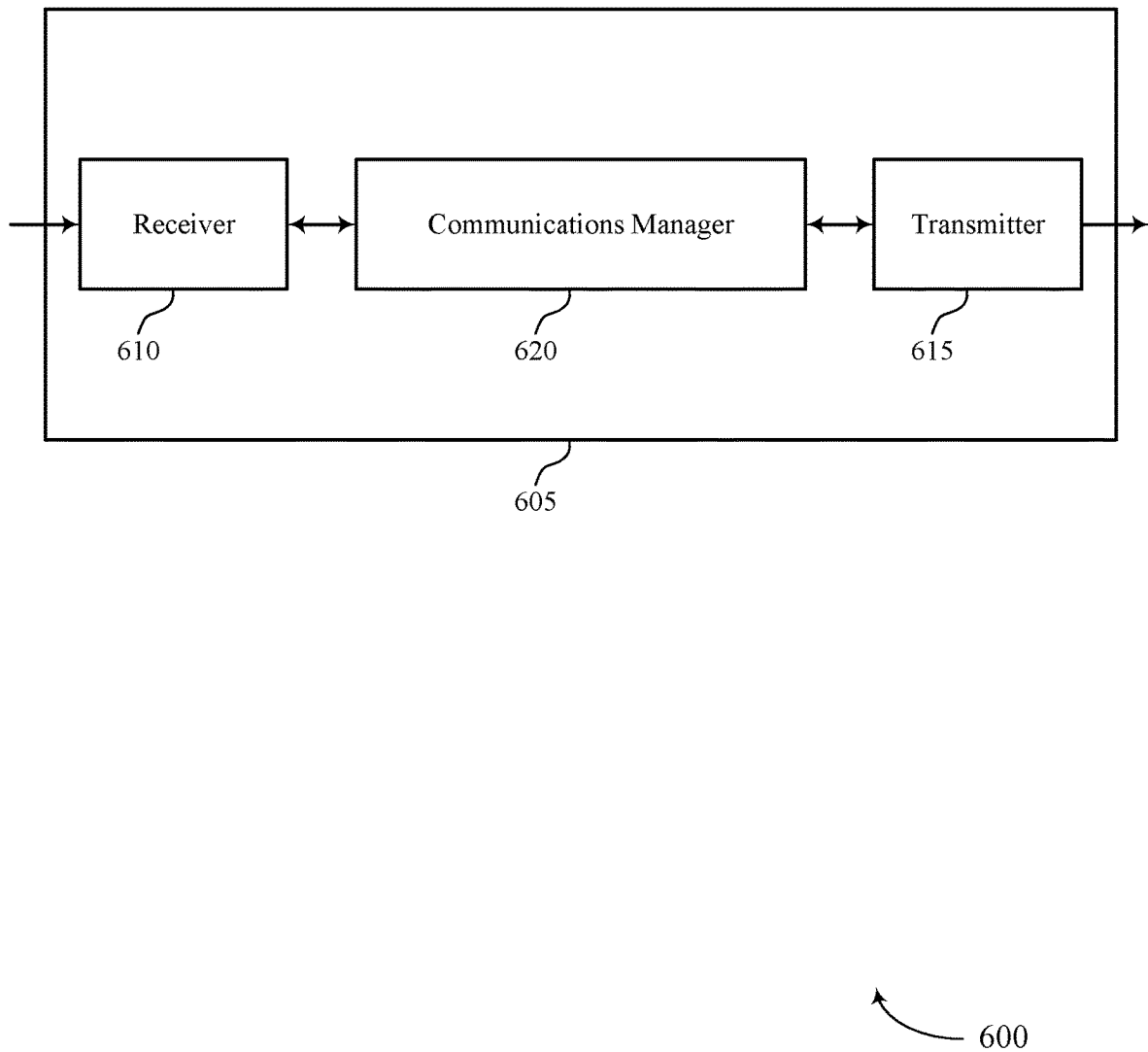
FIGS. 6 and 7 show block diagrams of devices that support constellation distortion indication for single carrier waveform digital post distortion in accordance with aspects of the present disclosure.

FIG. 6 shows a block diagram 600 of a device 605 that supports constellation distortion indication for single carrier waveform digital post distortion in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to constellation distortion indication for single carrier waveform digital post distortion). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to constellation distortion indication for single carrier waveform digital post distortion). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of constellation distortion indication for single carrier waveform digital post distortion as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication the device 605 in accordance with examples as disclosed herein. For example, the communications manager 620 may be configured as or otherwise support a means for receiving control signaling including an indication of a set of constellation points for a set of constellation distortion points, the set of constellation distortion points of a constellation distribution associated with a modulation scheme. The communications manager 620 may be configured as or otherwise support a means for performing a digital post distortion operation based on the set of constellation points for the set of constellation distortion points of the constellation distribution. The communications manager 620 may be configured as or otherwise support a means for decoding the wireless communication based on performing of the digital post distortion operation. By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption.

Figure 7:
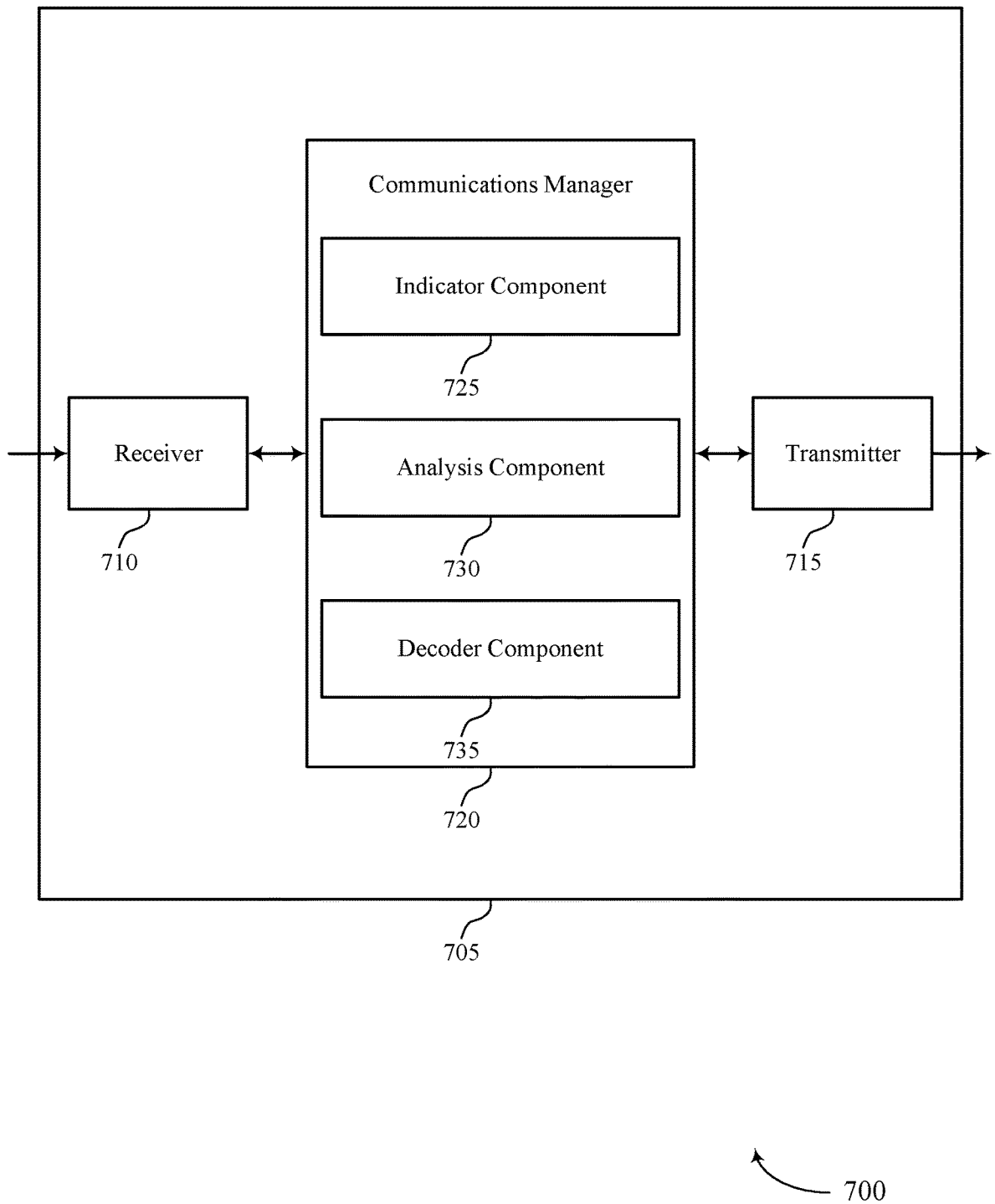

FIG. 7 shows a block diagram 700 of a device 705 that supports constellation distortion indication for single carrier waveform digital post distortion in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to constellation distortion indication for single carrier waveform digital post distortion). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to constellation distortion indication for single carrier waveform digital post distortion). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of constellation distortion indication for single carrier waveform digital post distortion as described herein. For example, the communications manager 720 may include an indicator component 725, an analysis component 730, a decoder component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at the device 705 in accordance with examples as disclosed herein. The indicator component 725 may be configured as or otherwise support a means for receiving control signaling including an indication of a set of constellation points for a set of constellation distortion points, the set of constellation distortion points of a constellation distribution associated with a modulation scheme. The analysis component 730 may be configured as or otherwise support a means for performing a digital post distortion operation based on the set of constellation points for the set of constellation distortion points of the constellation distribution. The decoder component 735 may be configured as or otherwise support a means for decoding the wireless communication based on performing of the digital post distortion operation.

Figure 8:
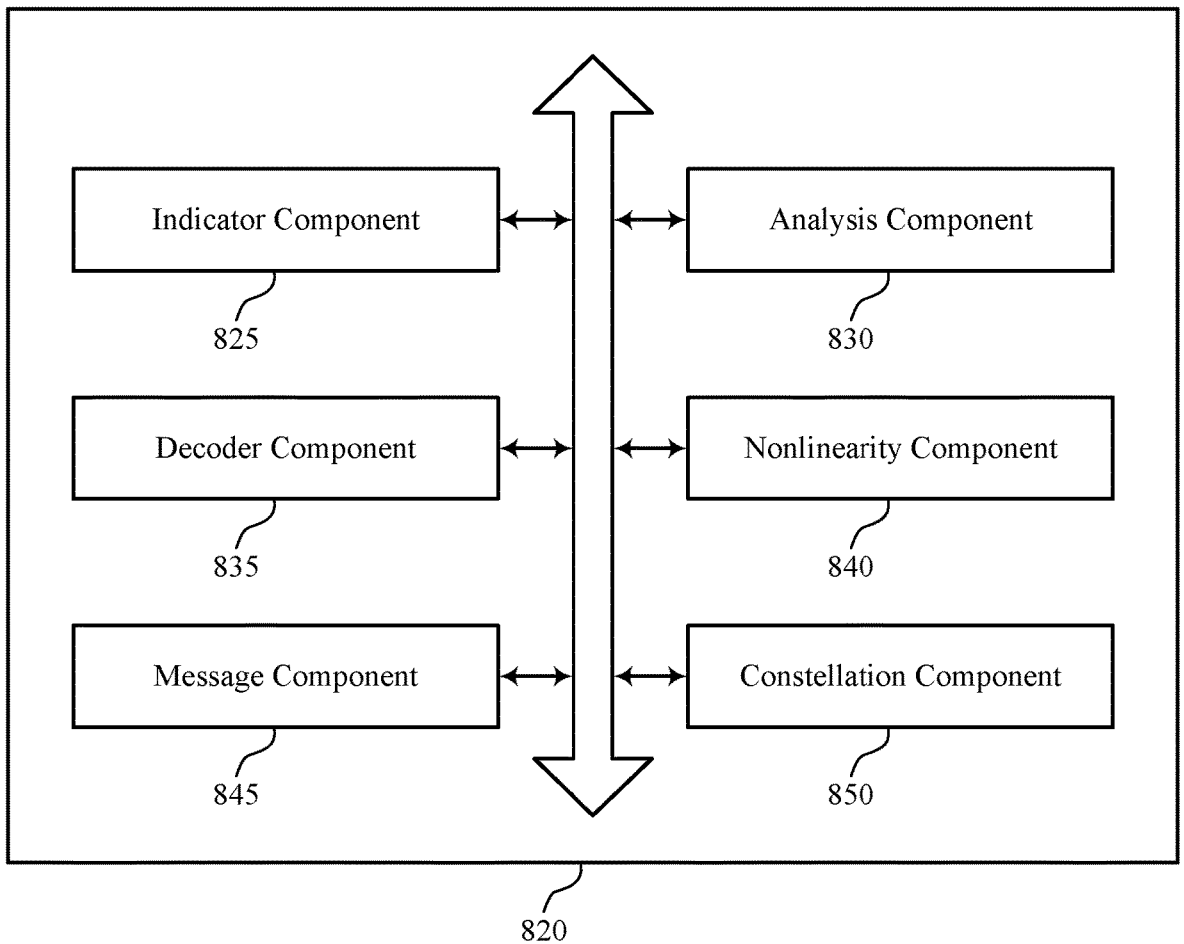
FIG. 8 shows a block diagram of a communications manager that supports constellation distortion indication for single carrier waveform digital post distortion in accordance with aspects of the present disclosure.

FIG. 8 shows a block diagram 800 of a communications manager 820 that supports constellation distortion indication for single carrier waveform digital post distortion in accordance with aspects of the present disclosure. The communications manager 820 may be an example of aspects of a communications manager 620, a communications manager 720, or both, as described herein. The communications manager 820, or various components thereof, may be an example of means for performing various aspects of constellation distortion indication for single carrier waveform digital post distortion as described herein. For example, the communications manager 820 may include an indicator component 825, an analysis component 830, a decoder component 835, a nonlinearity component 840, a message component 845, a constellation component 850, or any combination thereof. Each of these components may communicate, directly or indirectly, with one another (e.g., via one or more buses).

The communications manager 820 may support wireless communication at a UE in accordance with examples as disclosed herein. The indicator component 825 may be configured as or otherwise support a means for receiving control signaling including an indication of a set of constellation points for a set of constellation distortion points, the set of constellation distortion points of a constellation distribution associated with a modulation scheme. The analysis component 830 may be configured as or otherwise support a means for performing a digital post distortion operation based on the set of constellation points for the set of constellation distortion points of the constellation distribution. The decoder component 835 may be configured as or otherwise support a means for decoding the wireless communication based on performing of the digital post distortion operation.

In some examples, to support performing the digital post distortion operation, the nonlinearity component 840 may be configured as or otherwise support a means for estimating a nonlinearity error of a power amplifier based on the set of constellation points for the set of constellation distortion points of the constellation distribution. In some examples, to support performing the digital post distortion operation, the decoder component 835 may be configured as or otherwise support a means for decoding the wireless communication based on the nonlinearity error of the power amplifier. In some examples, receiving the control signaling including the indication of the set of constellation points for the set of constellation distortion points of the constellation distribution associated with the modulation scheme is based on a power amplifier compression level.

In some examples, to support receiving the control signaling, the message component 845 may be configured as or otherwise support a means for receiving a DCI message including the indication of the set of constellation points for the set of constellation distortion points of the constellation distribution associated with the modulation scheme. In some examples, the constellation component 850 may be configured as or otherwise support a means for determining an entry of a table that corresponds to the set of constellation distortion points of the constellation distribution associated with the modulation scheme based on the DCI message. In some examples, the analysis component 830 may be configured as or otherwise support a means for performing the digital post distortion operation based on determining the entry of the table that corresponds to the set of constellation distortion points of the constellation distribution associated with the modulation scheme.

In some examples, the message component 845 may be configured as or otherwise support a means for receiving one or more of an RRC message or a MAC-CE including a configuration of the table including the set of constellation distortion points of the constellation distribution associated with the modulation scheme. In some examples, the constellation component 850 may be configured as or otherwise support a means for determining the entry of the table that corresponds to the set of constellation distortion points of the constellation distribution associated with the modulation scheme based on one or more of the RRC message or the MAC-CE.

In some examples, to support receiving the control signaling, the message component 845 may be configured as or otherwise support a means for receiving an RRC message including the indication of the set of constellation points for the set of constellation distortion points of the constellation distribution associated with the modulation scheme. In some examples, to support receiving the control signaling, the analysis component 830 may be configured as or otherwise support a means for performing the digital post distortion operation based on the RRC message including the indication of the set of constellation points for the set of constellation distortion points of the constellation distribution.

In some examples, to support receiving the control signaling, the message component 845 may be configured as or otherwise support a means for receiving a MAC-CE including the indication of the set of constellation points for the set of constellation distortion points of the constellation distribution associated with the modulation scheme. In some examples, to support receiving the control signaling, the analysis component 830 may be configured as or otherwise support a means for performing the digital post distortion operation based on the MAC-CE including the indication of the set of constellation points for the set of constellation distortion points of the constellation distribution associated with the modulation scheme.

In some examples, the constellation component 850 may be configured as or otherwise support a means for determining a set of constellation point offsets between a set of default constellation points and the set of constellation distortion points of the constellation distribution associated with the modulation scheme based on the indication. In some examples, the constellation component 850 may be configured as or otherwise support a means for determining the set of constellation points for the set of constellation distortion points of the constellation distribution based on the set of constellation point offsets. In some examples, the analysis component 830 may be configured as or otherwise support a means for where performing the digital post distortion operation is based on determining of the set of constellation points for the set of constellation distortion points of the constellation distribution.

In some examples, the set of constellation points for the set of constellation distortion points of the constellation distribution corresponds to a set of edge constellation points of the constellation distribution. In some examples, the set of constellation points for the set of constellation distortion points of the constellation distribution corresponds to a set of radiuses of constellation points of the constellation distribution. In some examples, the modulation scheme includes QAM or APSK modulation. In some examples, the wireless communication includes a single carrier waveform transmission.

Figure 9:
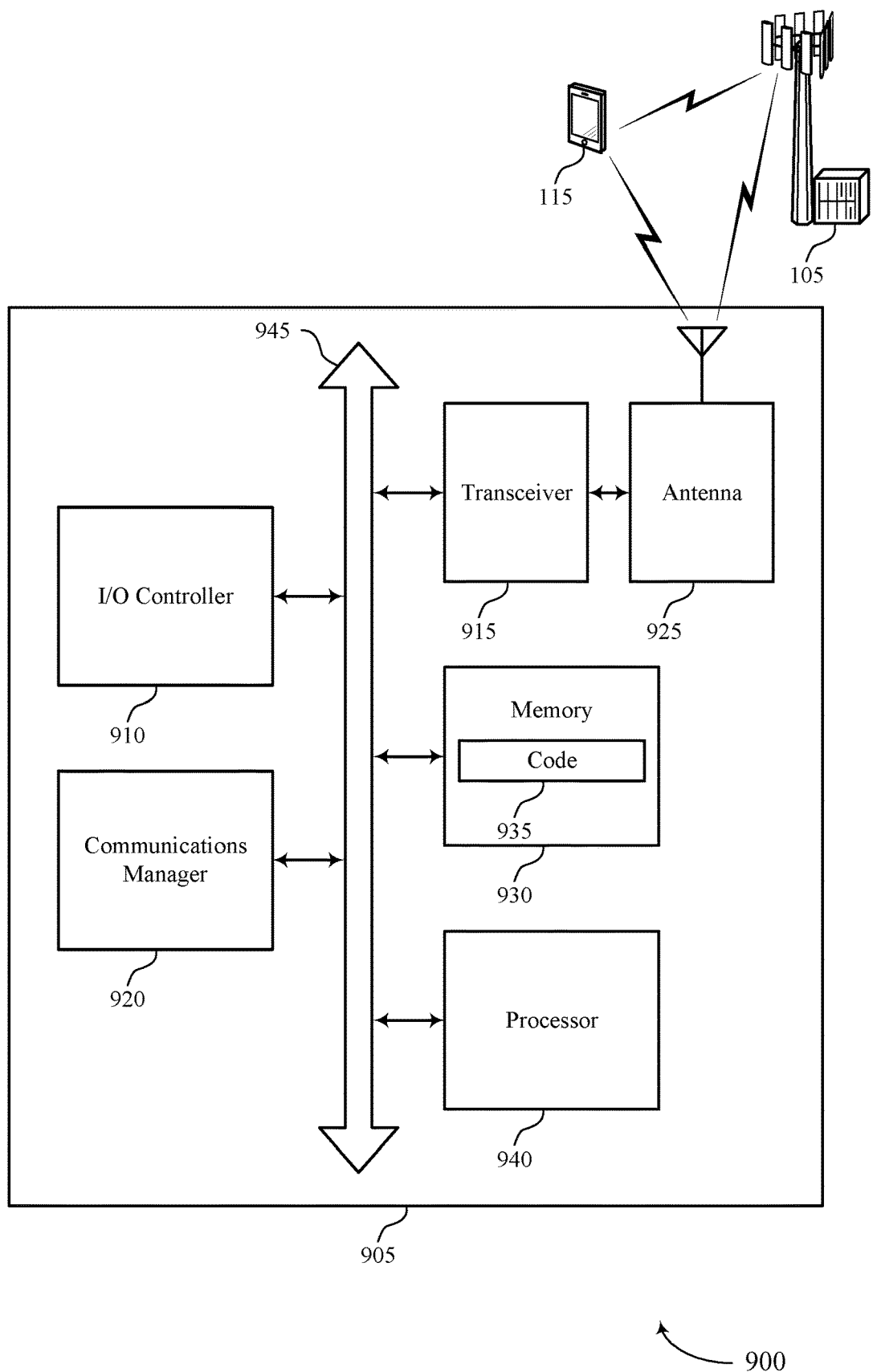
FIG. 9 shows a diagram of a system including a device that supports constellation distortion indication for single carrier waveform digital post distortion in accordance with aspects of the present disclosure.

FIG. 9 shows a diagram of a system 900 including a device 905 that supports constellation distortion indication for single carrier waveform digital post distortion in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting constellation distortion indication for single carrier waveform digital post distortion). For example, the device 905 or a component of the device 905 may include a processor 940 and memory 930 coupled to the processor 940, the processor 940 and memory 930 configured to perform various functions described herein.

The communications manager 920 may support wireless communication at the device 905 in accordance with examples as disclosed herein. For example, the communications manager 920 may be configured as or otherwise support a means for receiving control signaling including an indication of a set of constellation points for a set of constellation distortion points, the set of constellation distortion points of a constellation distribution associated with a modulation scheme. The communications manager 920 may be configured as or otherwise support a means for performing a digital post distortion operation based on the set of constellation points for the set of constellation distortion points of the constellation distribution. The communications manager 920 may be configured as or otherwise support a means for decoding the wireless communication based on performing of the digital post distortion operation. By including or configuring the communications manager 920 in accordance with examples as described herein, the device 905 may support techniques for improved communication reliability, reduced latency, improved coordination between devices, and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of constellation distortion indication for single carrier waveform digital post distortion as described herein, or the processor 940 and the memory 930 may be otherwise configured to perform or support such operations.

Figure 10:
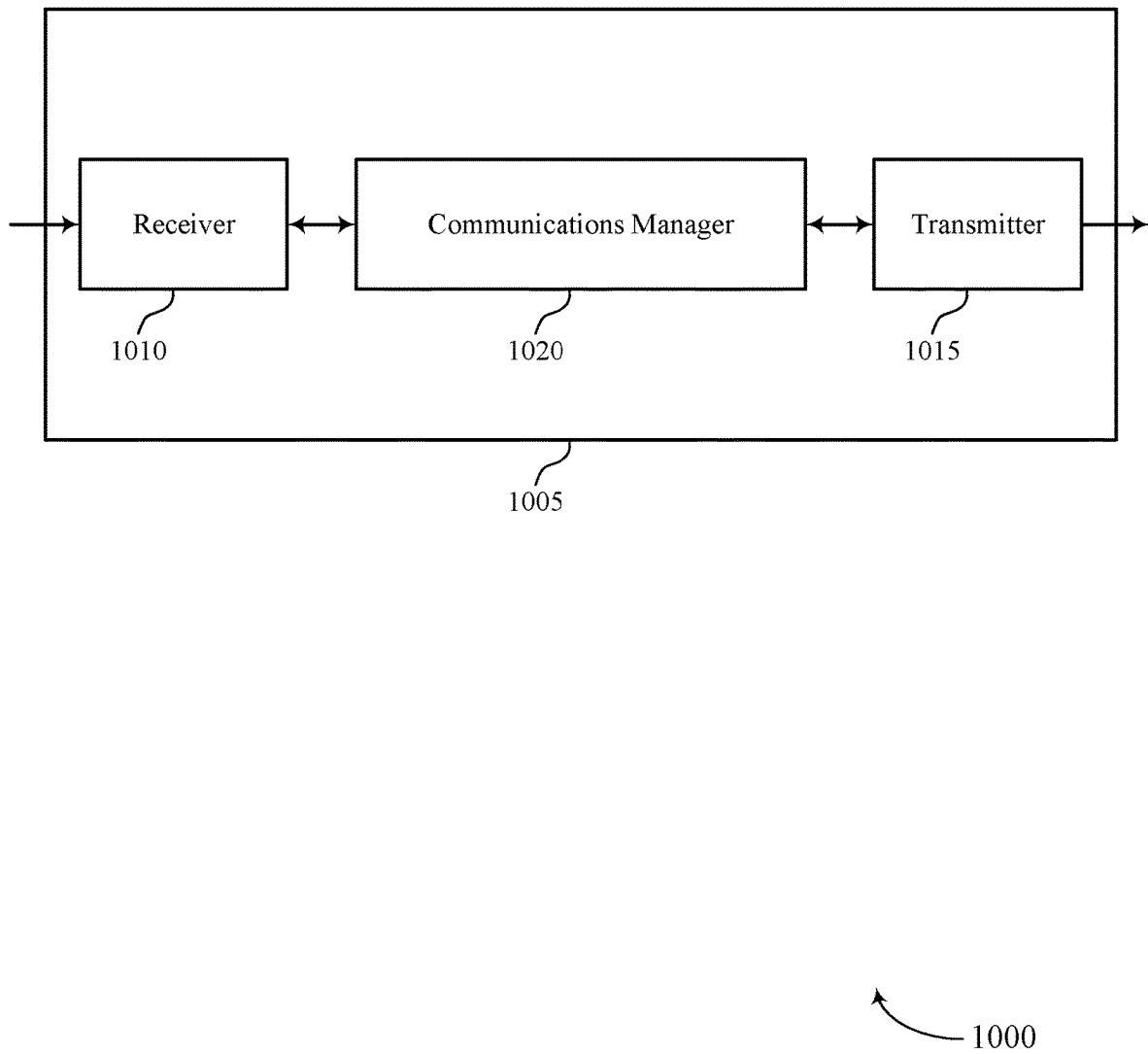
FIGS. 10 and 11 show block diagrams of devices that support constellation distortion indication for single carrier waveform digital post distortion in accordance with aspects of the present disclosure.

FIG. 10 shows a block diagram 1000 of a device 1005 that supports constellation distortion indication for single carrier waveform digital post distortion in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to constellation distortion indication for single carrier waveform digital post distortion). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to constellation distortion indication for single carrier waveform digital post distortion). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of constellation distortion indication for single carrier waveform digital post distortion as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 in accordance with examples as disclosed herein. For example, the communications manager 1020 may be configured as or otherwise support a means for determining a set of constellation points for a set of constellation distortion points, the set of constellation distortion points of a constellation distribution associated with a modulation scheme. The communications manager 1020 may be configured as or otherwise support a means for transmitting control signaling including an indication of the set of constellation points for the set of constellation distortion points. By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, and more efficient utilization of communication resources.

Figure 11:
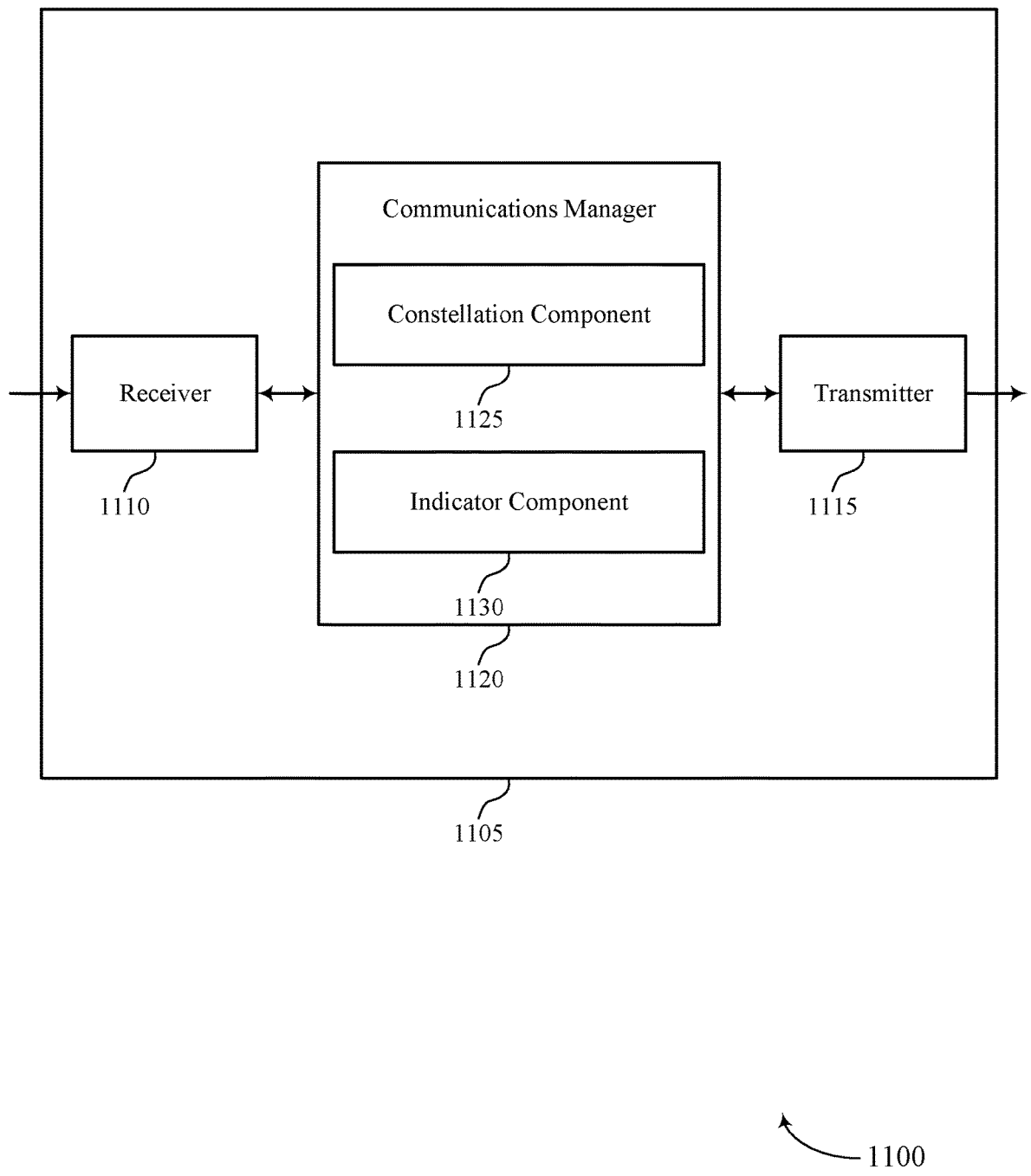

FIG. 11 shows a block diagram 1100 of a device 1105 that supports constellation distortion indication for single carrier waveform digital post distortion in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to constellation distortion indication for single carrier waveform digital post distortion). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to constellation distortion indication for single carrier waveform digital post distortion). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of constellation distortion indication for single carrier waveform digital post distortion as described herein. For example, the communications manager 1120 may include a constellation component 1125 an indicator component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 in accordance with examples as disclosed herein. The constellation component 1125 may be configured as or otherwise support a means for determining a set of constellation points for a set of constellation distortion points, the set of constellation distortion points of a constellation distribution associated with a modulation scheme. The indicator component 1130 may be configured as or otherwise support a means for transmitting control signaling including an indication of the set of constellation points for the set of constellation distortion points.

Figure 12:
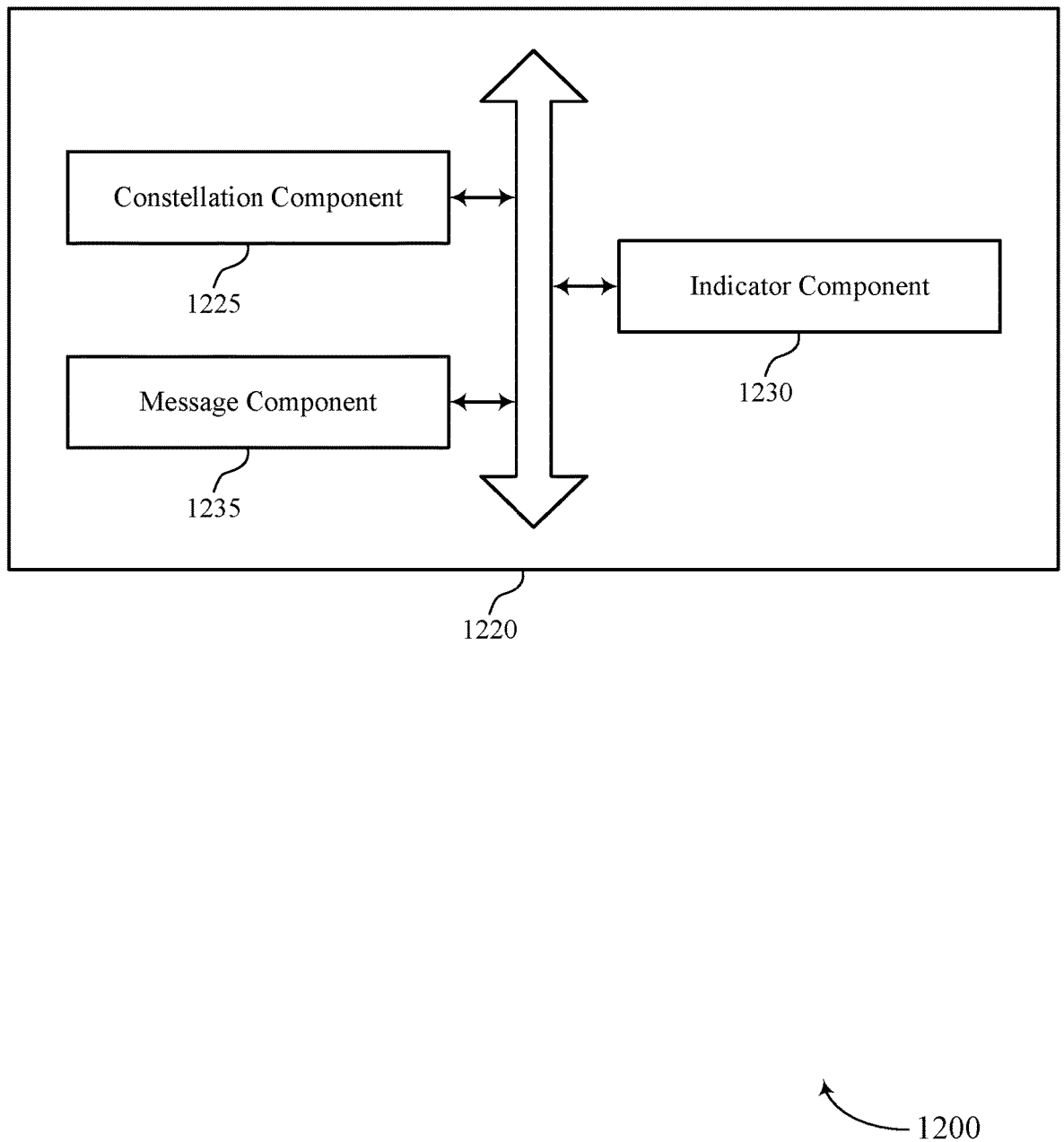
FIG. 12 shows a block diagram of a communications manager that supports constellation distortion indication for single carrier waveform digital post distortion in accordance with aspects of the present disclosure.

FIG. 12 shows a block diagram 1200 of a communications manager 1220 that supports constellation distortion indication for single carrier waveform digital post distortion in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of constellation distortion indication for single carrier waveform digital post distortion as described herein. For example, the communications manager 1220 may include a constellation component 1225, an indicator component 1230, a message component 1235, or any combination thereof. Each of these components may communicate, directly or indirectly, with one another (e.g., via one or more buses).

The communications manager 1220 may support wireless communication at a base station in accordance with examples as disclosed herein. The constellation component 1225 may be configured as or otherwise support a means for determining a set of constellation points for a set of constellation distortion points, the set of constellation distortion points of a constellation distribution associated with a modulation scheme. The indicator component 1230 may be configured as or otherwise support a means for transmitting control signaling including an indication of the set of constellation points for the set of constellation distortion points.

In some examples, to support transmitting the control signaling, the message component 1235 may be configured as or otherwise support a means for transmitting a DCI message including the indication of the set of constellation points for the set of constellation distortion points of the constellation distribution associated with the modulation scheme. In some examples, to support transmitting the control signaling, the message component 1235 may be configured as or otherwise support a means for transmitting one or more of an RRC message or a MAC-CE including a configuration of a table including an entry of the set of constellation distortion points of the constellation distribution associated with the modulation scheme.

In some examples, to support transmitting the control signaling, the message component 1235 may be configured as or otherwise support a means for transmitting an RRC message including the indication of the set of constellation points for the set of constellation distortion points of the constellation distribution associated with the modulation scheme. In some examples, to support transmitting the control signaling, the message component 1235 may be configured as or otherwise support a means for transmitting a MAC-CE including the indication of the set of constellation points for the set of constellation distortion points of the constellation distribution associated with the modulation scheme. In some examples, transmitting the control signaling including the indication of the set of constellation points for the set of constellation distortion points of the constellation distribution associated with the modulation scheme is based on a power amplifier compression level associated with the base station.

In some examples, the constellation component 1225 may be configured as or otherwise support a means for determining a set of constellation point offsets between a set of default constellation points and the set of constellation distortion points of the constellation distribution associated with the modulation scheme, the indication indicates the set of constellation point offsets. In some examples, the indicator component 1230 may be configured as or otherwise support a means for transmitting control signaling including the indication of the set of constellation points and the set of constellation point offsets for the set of constellation distortion points of the constellation distribution associated with the modulation scheme.

In some examples, the set of constellation points for the set of constellation distortion points of the constellation distribution corresponds to a set of edge constellation points of the constellation distribution. In some examples, the set of constellation points for the set of constellation distortion points of the constellation distribution corresponds to a set of radiuses of constellation points of the constellation distribution. In some examples, the modulation scheme includes QAM or APSK modulation. In some examples, the wireless communication includes a single carrier waveform transmission.

Figure 13:
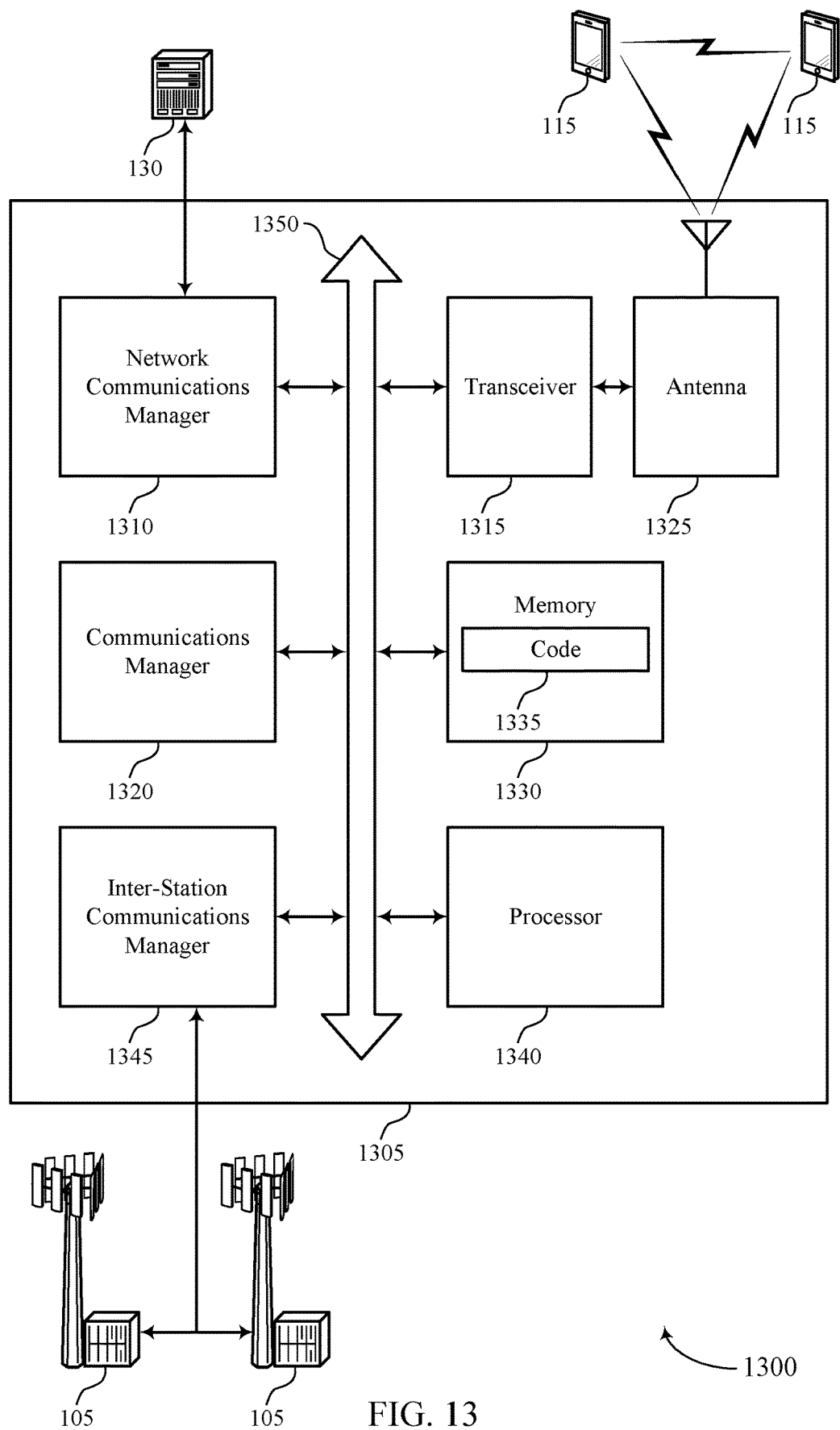
FIG. 13 shows a diagram of a system including a device that supports constellation distortion indication for single carrier waveform digital post distortion in accordance with aspects of the present disclosure.

FIG. 13 shows a diagram of a system 1300 including a device 1305 that supports constellation distortion indication for single carrier waveform digital post distortion in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting constellation distortion indication for single carrier waveform digital post distortion). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at the device 1305 in accordance with examples as disclosed herein. For example, the communications manager 1320 may be configured as or otherwise support a means for determining a set of constellation points for a set of constellation distortion points, the set of constellation distortion points of a constellation distribution associated with a modulation scheme. The communications manager 1320 may be configured as or otherwise support a means for transmitting control signaling including an indication of the set of constellation points for the set of constellation distortion points. By including or configuring the communications manager 1320 in accordance with examples as described herein, the device 1305 may support techniques for improved communication reliability, reduced latency, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of constellation distortion indication for single carrier waveform digital post distortion as described herein, or the processor 1340 and the memory 1330 may be otherwise configured to perform or support such operations.

Figure 14:
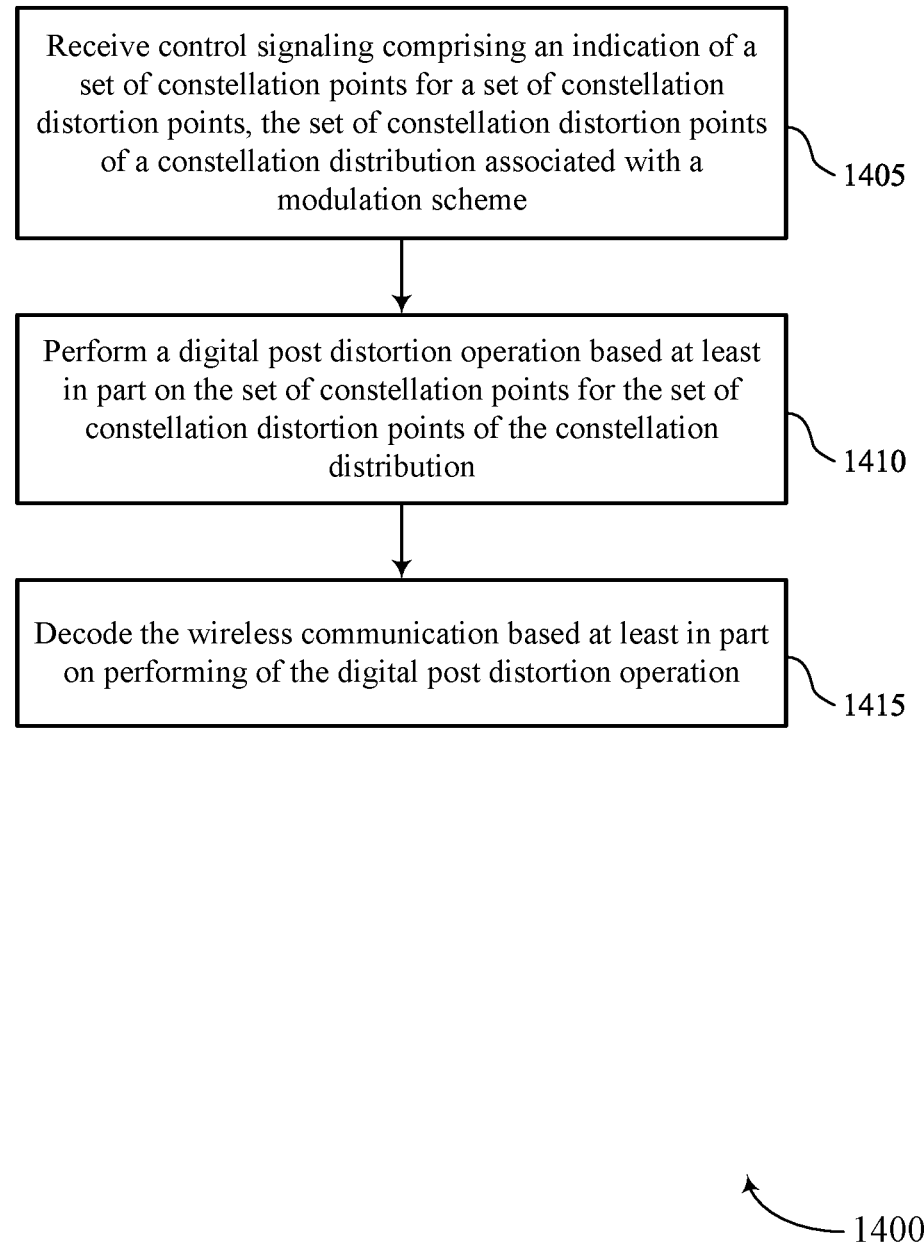
FIGS. 14 through 19 show flowcharts illustrating methods that support constellation distortion indication for single carrier waveform digital post distortion in accordance with aspects of the present disclosure.

FIG. 14 shows a flowchart illustrating a method 1400 that supports constellation distortion indication for single carrier waveform digital post distortion in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control signaling including an indication of a set of constellation points for a set of constellation distortion points, the set of constellation distortion points of a constellation distribution associated with a modulation scheme. The operations of 1405 may be performed in accordance with examples as disclosed herein. In some examples, aspects of the operations of 1405 may be performed by an indicator component 825 as described with reference to FIG. 8.

At 1410, the method may include performing a digital post distortion operation based on the set of constellation points for the set of constellation distortion points of the constellation distribution. The operations of 1410 may be performed in accordance with examples as disclosed herein. In some examples, aspects of the operations of 1410 may be performed by an analysis component 830 as described with reference to FIG. 8.

At 1415, the method may include decoding the wireless communication based on performing of the digital post distortion operation. The operations of 1415 may be performed in accordance with examples as disclosed herein. In some examples, aspects of the operations of 1415 may be performed by a decoder component 835 as described with reference to FIG. 8.

Figure 15:
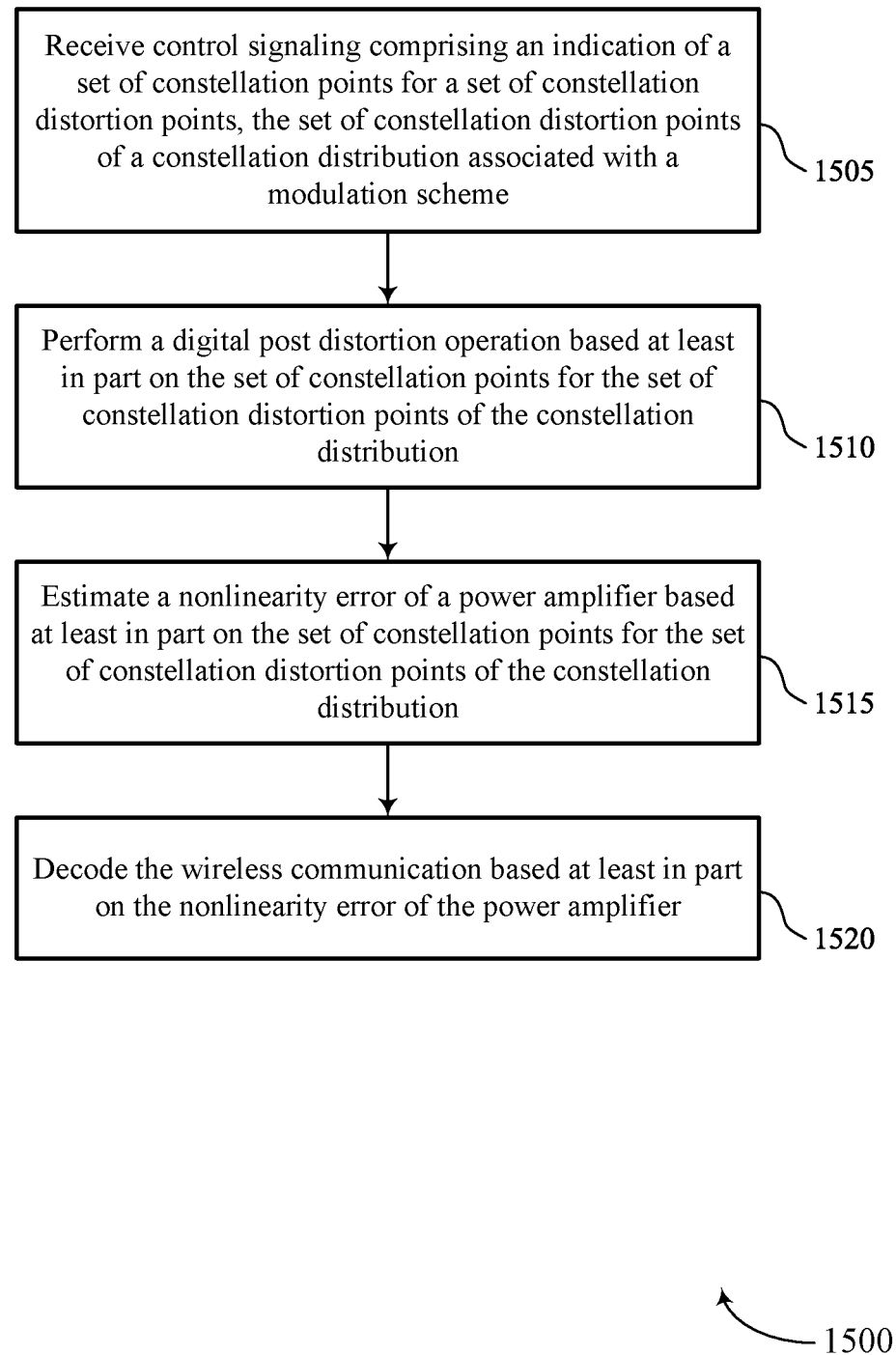

FIG. 15 shows a flowchart illustrating a method 1500 that supports constellation distortion indication for single carrier waveform digital post distortion in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling including an indication of a set of constellation points for a set of constellation distortion points, the set of constellation distortion points of a constellation distribution associated with a modulation scheme. The operations of 1505 may be performed in accordance with examples as disclosed herein. In some examples, aspects of the operations of 1505 may be performed by an indicator component 825 as described with reference to FIG. 8.

At 1510, the method may include performing a digital post distortion operation based on the set of constellation points for the set of constellation distortion points of the constellation distribution. The operations of 1510 may be performed in accordance with examples as disclosed herein. In some examples, aspects of the operations of 1510 may be performed by an analysis component 830 as described with reference to FIG. 8.

At 1515, the method may include estimating a nonlinearity error of a power amplifier based on the set of constellation points for the set of constellation distortion points of the constellation distribution. The operations of 1515 may be performed in accordance with examples as disclosed herein. In some examples, aspects of the operations of 1515 may be performed by a nonlinearity component 840 as described with reference to FIG. 8.

At 1520, the method may include decoding the wireless communication based on the nonlinearity error of the power amplifier. The operations of 1520 may be performed in accordance with examples as disclosed herein. In some examples, aspects of the operations of 1520 may be performed by a decoder component 835 as described with reference to FIG. 8.

Figure 16:
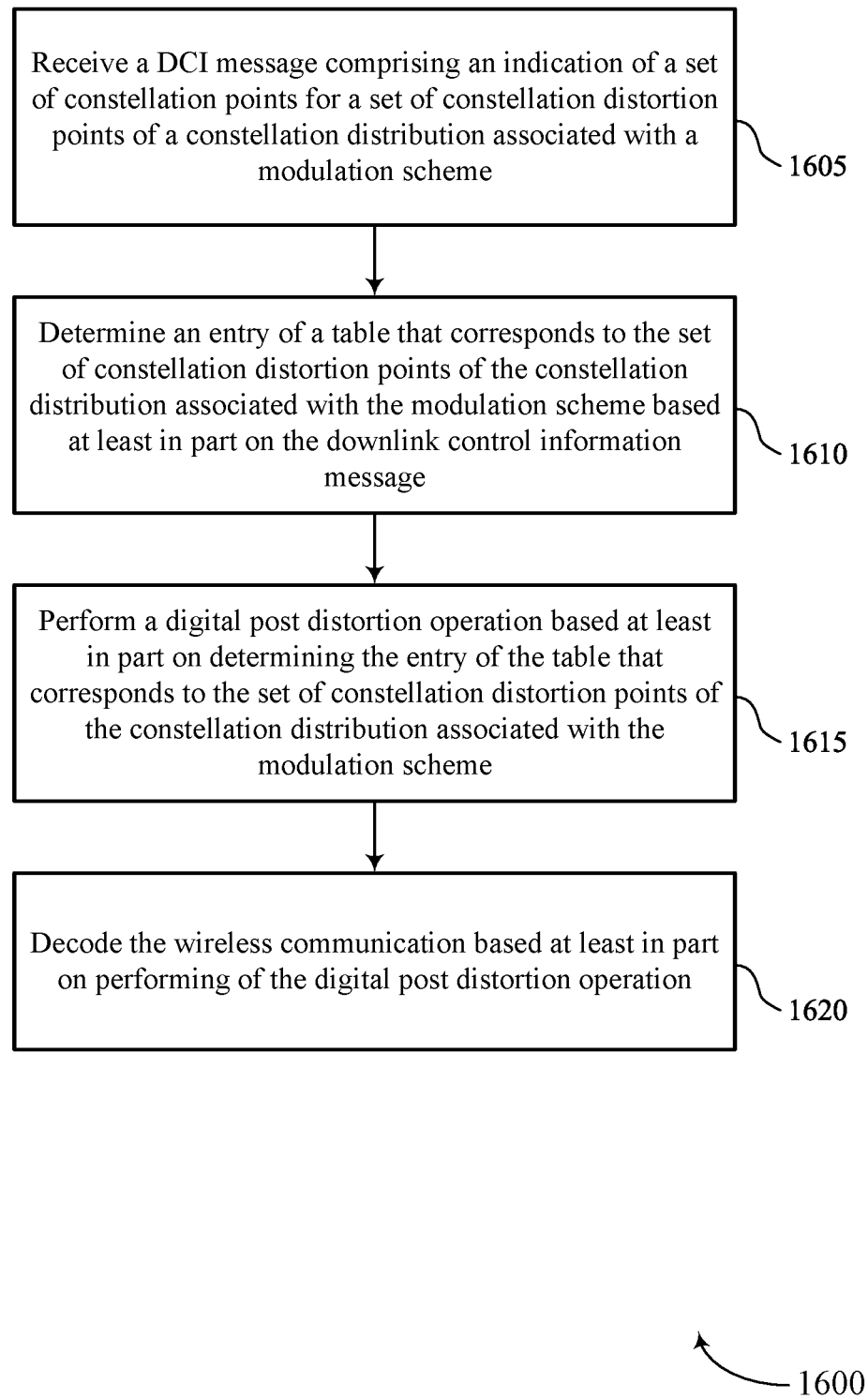

FIG. 16 shows a flowchart illustrating a method 1600 that supports constellation distortion indication for single carrier waveform digital post distortion in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a DCI message including an indication of a set of constellation points for a set of constellation distortion points of a constellation distribution associated with a modulation scheme. The operations of 1605 may be performed in accordance with examples as disclosed herein. In some examples, aspects of the operations of 1605 may be performed by a message component 845 as described with reference to FIG. 8.

At 1610, the method may include determining an entry of a table that corresponds to the set of constellation distortion points of the constellation distribution associated with the modulation scheme based on the DCI message. The operations of 1610 may be performed in accordance with examples as disclosed herein. In some examples, aspects of the operations of 1610 may be performed by a constellation component 850 as described with reference to FIG. 8.

At 1615, the method may include performing a digital post distortion operation based on determining the entry of the table that corresponds to the set of constellation distortion points of the constellation distribution associated with the modulation scheme. The operations of 1615 may be performed in accordance with examples as disclosed herein. In some examples, aspects of the operations of 1615 may be performed by an analysis component 830 as described with reference to FIG. 8.

At 1620, the method may include decoding the wireless communication based on performing of the digital post distortion operation. The operations of 1620 may be performed in accordance with examples as disclosed herein. In some examples, aspects of the operations of 1620 may be performed by a decoder component 835 as described with reference to FIG. 8.

Figure 17:
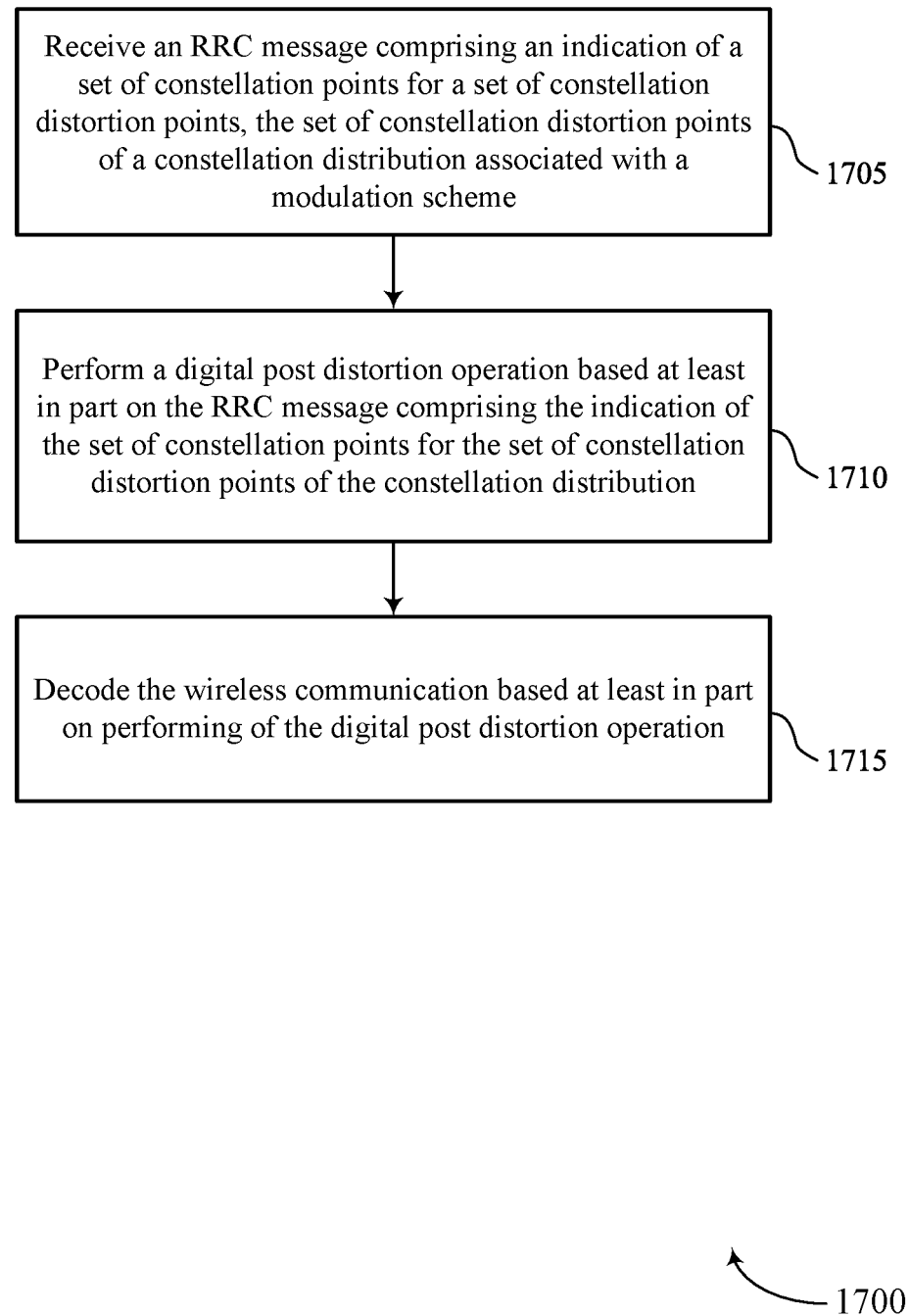

FIG. 17 shows a flowchart illustrating a method 1700 that supports constellation distortion indication for single carrier waveform digital post distortion in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving an RRC message including an indication of a set of constellation points for a set of constellation distortion points, the set of constellation distortion points of a constellation distribution associated with a modulation scheme. The operations of 1705 may be performed in accordance with examples as disclosed herein. In some examples, aspects of the operations of 1705 may be performed by an indicator component 825 as described with reference to FIG. 8.

At 1710, the method may include performing a digital post distortion operation based on the RRC message including the indication of the set of constellation points for the set of constellation distortion points of the constellation distribution. The operations of 1710 may be performed in accordance with examples as disclosed herein. In some examples, aspects of the operations of 1710 may be performed by an analysis component 830 as described with reference to FIG. 8.

At 1715, the method may include decoding the wireless communication based on performing of the digital post distortion operation. The operations of 1715 may be performed in accordance with examples as disclosed herein. In some examples, aspects of the operations of 1715 may be performed by a decoder component 835 as described with reference to FIG. 8.

Figure 18:
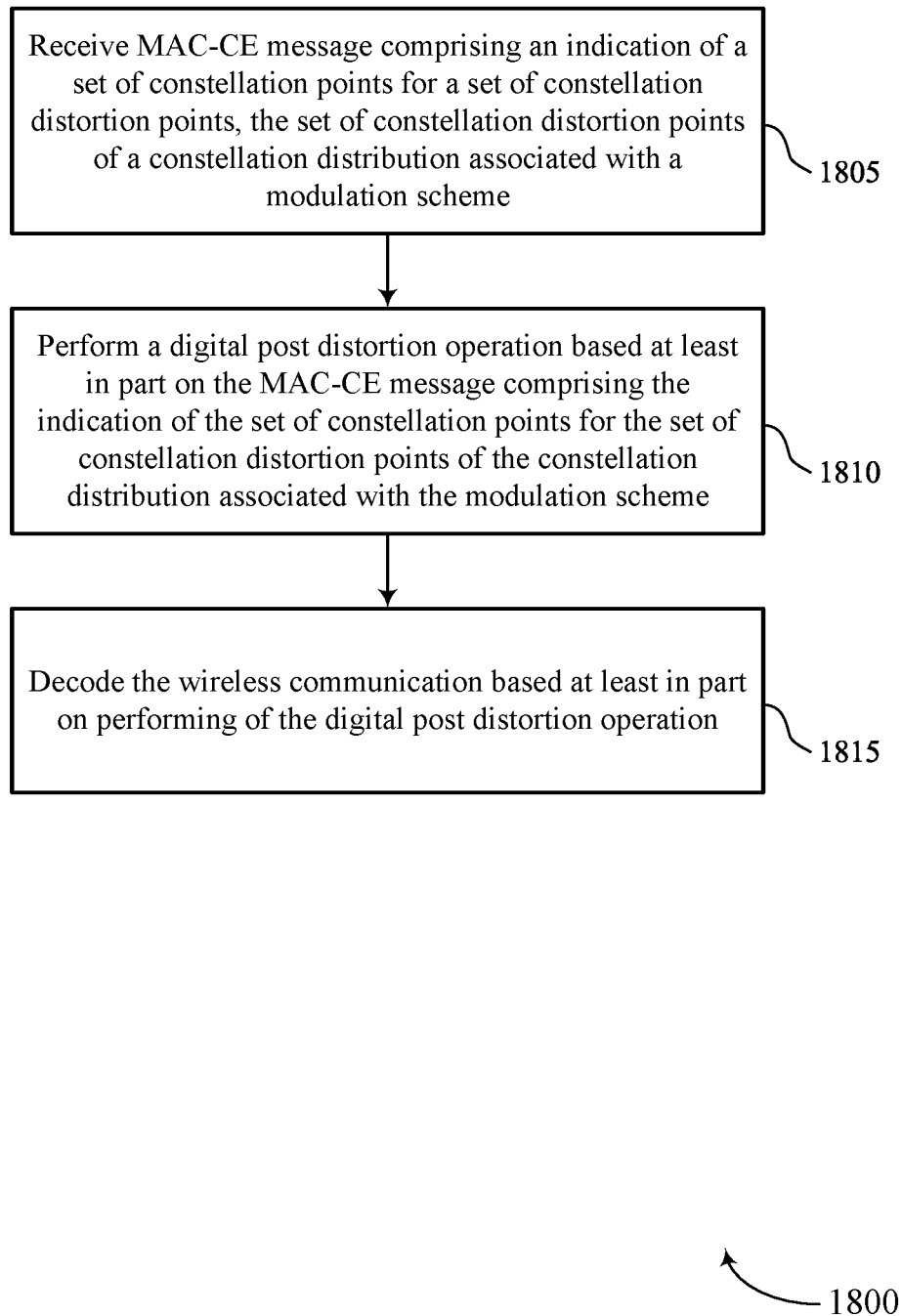

FIG. 18 shows a flowchart illustrating a method 1800 that supports constellation distortion indication for single carrier waveform digital post distortion in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving a MAC-CE including an indication of a set of constellation points for a set of constellation distortion points, the set of constellation distortion points of a constellation distribution associated with a modulation scheme. The operations of 1805 may be performed in accordance with examples as disclosed herein. In some examples, aspects of the operations of 1805 may be performed by an indicator component 825 as described with reference to FIG. 8.

At 1810, the method may include performing a digital post distortion operation is based on the MAC-CE including the indication of the set of constellation points for the set of constellation distortion points of the constellation distribution associated with the modulation scheme. The operations of 1810 may be performed in accordance with examples as disclosed herein. In some examples, aspects of the operations of 1810 may be performed by an analysis component 830 as described with reference to FIG. 8.

At 1815, the method may include decoding the wireless communication based on performing of the digital post distortion operation. The operations of 1815 may be performed in accordance with examples as disclosed herein. In some examples, aspects of the operations of 1815 may be performed by a decoder component 835 as described with reference to FIG. 8.

Figure 19:
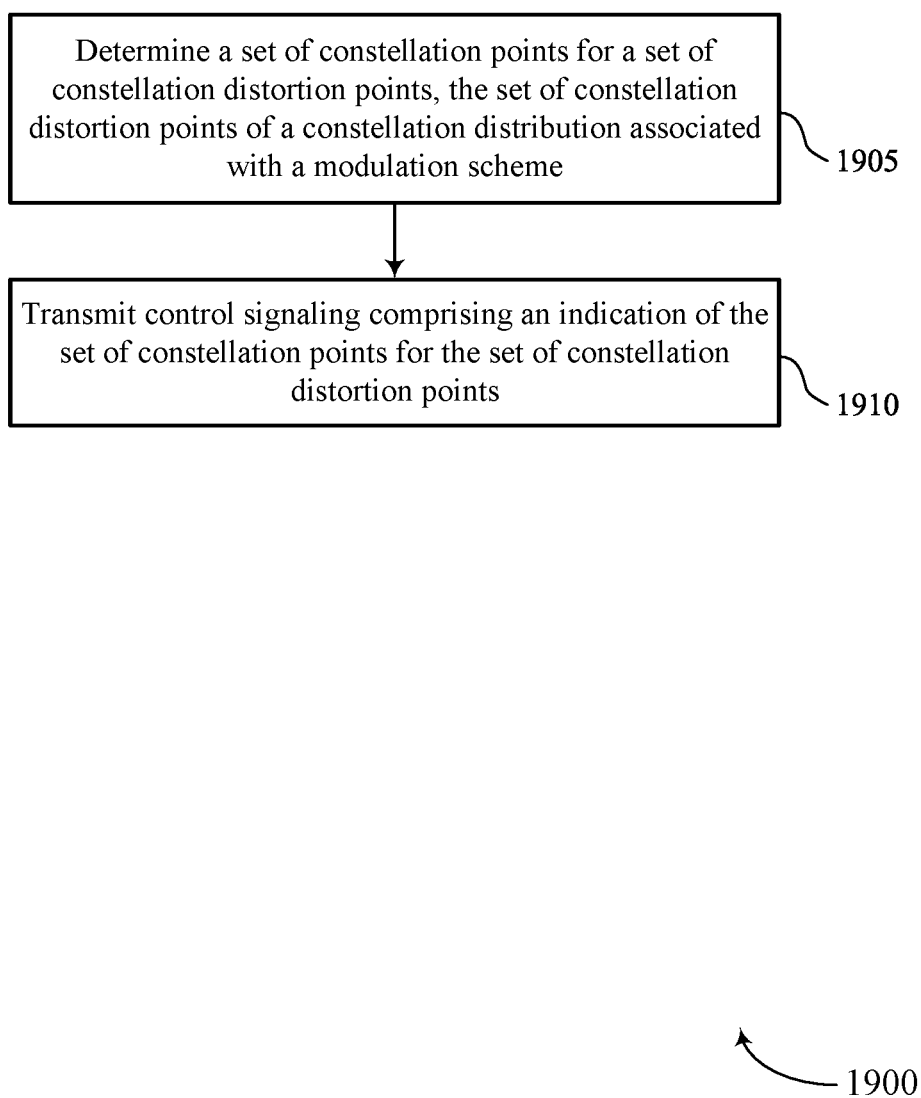

FIG. 19 shows a flowchart illustrating a method 1900 that supports constellation distortion indication for single carrier waveform digital post distortion in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include determining a set of constellation points for a set of constellation distortion points, the set of constellation distortion points of a constellation distribution associated with a modulation scheme. The operations of 1905 may be performed in accordance with examples as disclosed herein. In some examples, aspects of the operations of 1905 may be performed by a constellation component 1225 as described with reference to FIG. 12.

At 1910, the method may include transmitting control signaling including an indication of the set of constellation points for the set of constellation distortion points. The operations of 1910 may be performed in accordance with examples as disclosed herein. In some examples, aspects of the operations of 1910 may be performed by an indicator component 1230 as described with reference to FIG. 12.

The following provides an overview of aspects of the present disclosure:

Aspect 1: A method for wireless communication at a UE, comprising: receiving control signaling comprising an indication of a set of constellation points for a set of constellation distortion points, the set of constellation distortion points of a constellation distribution associated with a modulation scheme; performing a digital post distortion operation based at least in part on the set of constellation points for the set of constellation distortion points of the constellation distribution; and decoding the wireless communication based at least in part on performing of the digital post distortion operation.

Aspect 2: The method of aspect 1, wherein performing the digital post distortion operation comprises: estimating a nonlinearity error of a power amplifier based at least in part on the set of constellation points for the set of constellation distortion points of the constellation distribution, wherein decoding the wireless communication is based at least in part on the nonlinearity error of the power amplifier.

Aspect 3: The method of any of aspects 1 through 2, wherein receiving the control signaling comprises: receiving a DCI message comprising the indication of the set of constellation points for the set of constellation distortion points of the constellation distribution associated with the modulation scheme.

Aspect 4: The method of aspect 3, further comprising: determining an entry of a table that corresponds to the set of constellation distortion points of the constellation distribution associated with the modulation scheme based at least in part on the DCI message, wherein performing the digital post distortion operation is based at least in part on determining the entry of the table that corresponds to the set of constellation distortion points of the constellation distribution associated with the modulation scheme.

Aspect 5: The method of aspect 4, further comprising: receiving one or more of an RRC message or a MAC-CE comprising a configuration of the table comprising the set of constellation distortion points of the constellation distribution associated with the modulation scheme, wherein determining the entry of the table that corresponds to the set of constellation distortion points of the constellation distribution associated with the modulation scheme is based at least in part on one or more of the RRC message or the MAC-CE.

Aspect 6: The method of any of aspects 1 through 5, wherein receiving the control signaling comprises: receiving an RRC message comprising the indication of the set of constellation points for the set of constellation distortion points of the constellation distribution associated with the modulation scheme, wherein performing the digital post distortion operation is based at least in part on the RRC message comprising the indication of the set of constellation points for the set of constellation distortion points of the constellation distribution.

Aspect 7: The method of any of aspects 1 through 6, wherein receiving the control signaling comprises: receiving a MAC-CE comprising the indication of the set of constellation points for the set of constellation distortion points of the constellation distribution associated with the modulation scheme, wherein performing the digital post distortion operation is based at least in part on the MAC-CE comprising the indication of the set of constellation points for the set of constellation distortion points of the constellation distribution associated with the modulation scheme.

Aspect 8: The method of any of aspects 1 through 7, wherein receiving the control signaling comprising the indication of the set of constellation points for the set of constellation distortion points of the constellation distribution associated with the modulation scheme is based at least in part on a power amplifier compression level.

Aspect 9: The method of any of aspects 1 through 8, further comprising: determining a set of constellation point offsets between a set of default constellation points and the set of constellation distortion points of the constellation distribution associated with the modulation scheme based at least in part on the indication; and determining the set of constellation points for the set of constellation distortion points of the constellation distribution based at least in part on the set of constellation point offsets, wherein performing the digital post distortion operation is based at least in part on determining of the set of constellation points for the set of constellation distortion points of the constellation distribution.

Aspect 10: The method of any of aspects 1 through 9, wherein the set of constellation points for the set of constellation distortion points of the constellation distribution corresponds to a set of edge constellation points of the constellation distribution.

Aspect 11: The method of any of aspects 1 through 10, wherein the set of constellation points for the set of constellation distortion points of the constellation distribution corresponds to a set of radiuses of constellation points of the constellation distribution.

Aspect 12: The method of any of aspects 1 through 11, wherein the modulation scheme comprises QAM or APSK modulation.

Aspect 13: The method of any of aspects 1 through 12, wherein the wireless communication comprises a single carrier waveform transmission.

Aspect 14: A method for wireless communication at a base station, comprising: determining a set of constellation points for a set of constellation distortion points, the set of constellation distortion points of a constellation distribution associated with a modulation scheme; and transmitting control signaling comprising an indication of the set of constellation points for the set of constellation distortion points.

Aspect 15: The method of aspect 14, wherein transmitting the control signaling comprises: transmitting a DCI message comprising the indication of the set of constellation points for the set of constellation distortion points of the constellation distribution associated with the modulation scheme.

Aspect 16: The method of any of aspects 14 through 15, wherein transmitting the control signaling comprises: transmitting one or more of an RRC message or a MAC-CE comprising a configuration of a table comprising an entry of the set of constellation distortion points of the constellation distribution associated with the modulation scheme.

Aspect 17: The method of any of aspects 14 through 16, wherein transmitting the control signaling comprises: transmitting an RRC message comprising the indication of the set of constellation points for the set of constellation distortion points of the constellation distribution associated with the modulation scheme.

Aspect 18: The method of any of aspects 14 through 17, wherein transmitting the control signaling comprises: transmitting a MAC-CE comprising the indication of the set of constellation points for the set of constellation distortion points of the constellation distribution associated with the modulation scheme.

Aspect 19: The method of any of aspects 14 through 18, wherein transmitting the control signaling comprising the indication of the set of constellation points for the set of constellation distortion points of the constellation distribution associated with the modulation scheme is based at least in part on a power amplifier compression level associated with the base station.

Aspect 20: The method of any of aspects 14 through 19, further comprising: determining a set of constellation point offsets between a set of default constellation points and the set of constellation distortion points of the constellation distribution associated with the modulation scheme, the indication indicates the set of constellation point offsets, wherein transmitting the control signaling comprises: transmitting control signaling comprising the indication of the set of constellation points and the set of constellation point offsets for the set of constellation distortion points of the constellation distribution associated with the modulation scheme.

Aspect 21: The method of any of aspects 14 through 20, wherein the set of constellation points for the set of constellation distortion points of the constellation distribution corresponds to a set of edge constellation points of the constellation distribution.

Aspect 22: The method of any of aspects 14 through 21, wherein the set of constellation points for the set of constellation distortion points of the constellation distribution corresponds to a set of radiuses of constellation points of the constellation distribution.

Aspect 23: The method of any of aspects 14 through 22, wherein the modulation scheme comprises QAM or APSK modulation.

Aspect 24: The method of any of aspects 14 through 23, wherein the wireless communication comprises a single carrier waveform transmission.

Aspect 25: An apparatus for wireless communication at a UE, comprising a processor; memory coupled with the processor; and instructions stored in the memory and executable by the processor to cause the apparatus to perform a method of any of aspects 1 through 13.

Aspect 26: An apparatus for wireless communication at a UE, comprising at least one means for performing a method of any of aspects 1 through 13.

Aspect 27: A non-transitory computer-readable medium storing code for wireless communication at a UE, the code comprising instructions executable by a processor to perform a method of any of aspects 1 through 13.

Aspect 28: An apparatus for wireless communication at a base station, comprising a processor; memory coupled with the processor; and instructions stored in the memory and executable by the processor to cause the apparatus to perform a method of any of aspects 14 through 24.

Aspect 29: An apparatus for wireless communication at a base station, comprising at least one means for performing a method of any of aspects 14 through 24.

Aspect 30: A non-transitory computer-readable medium storing code for wireless communication at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving control signaling comprising an indication of a set of constellation points for a set of constellation distortion points, the set of constellation distortion points of a constellation distribution associated with a modulation scheme;
performing a digital post distortion operation based at least in part on the set of constellation points for the set of constellation distortion points of the constellation distribution; and
decoding the wireless communication based at least in part on performing of the digital post distortion operation.

2. The method of claim 1, wherein performing the digital post distortion operation comprises:
estimating a nonlinearity error of a power amplifier based at least in part on the set of constellation points for the set of constellation distortion points of the constellation distribution,
wherein decoding the wireless communication is based at least in part on the nonlinearity error of the power amplifier.

3. The method of claim 1, wherein receiving the control signaling comprises:
receiving a downlink control information message comprising the indication of the set of constellation points for the set of constellation distortion points of the constellation distribution associated with the modulation scheme.

4. The method of claim 3, further comprising:
determining an entry of a table that corresponds to the set of constellation distortion points of the constellation distribution associated with the modulation scheme based at least in part on the downlink control information message,
wherein performing the digital post distortion operation is based at least in part on determining the entry of the table that corresponds to the set of constellation distortion points of the constellation distribution associated with the modulation scheme.

5. The method of claim 4, further comprising:
receiving one or more of a radio resource control message or a medium access control-control element comprising a configuration of the table comprising the set of constellation distortion points of the constellation distribution associated with the modulation scheme,
wherein determining the entry of the table that corresponds to the set of constellation distortion points of the constellation distribution associated with the modulation scheme is based at least in part on one or more of the radio resource control message or the medium access control-control element.

6. The method of claim 1, wherein receiving the control signaling comprises:
receiving a radio resource control message comprising the indication of the set of constellation points for the set of constellation distortion points of the constellation distribution associated with the modulation scheme,
wherein performing the digital post distortion operation is based at least in part on the radio resource control message comprising the indication of the set of constellation points for the set of constellation distortion points of the constellation distribution.

7. The method of claim 1, wherein receiving the control signaling comprises:
receiving a medium access control-control element comprising the indication of the set of constellation points for the set of constellation distortion points of the constellation distribution associated with the modulation scheme,
wherein performing the digital post distortion operation is based at least in part on the medium access control-control element comprising the indication of the set of constellation points for the set of constellation distortion points of the constellation distribution associated with the modulation scheme.

8. The method of claim 1, wherein receiving the control signaling comprising the indication of the set of constellation points for the set of constellation distortion points of the constellation distribution associated with the modulation scheme is based at least in part on a power amplifier compression level.

9. The method of claim 1, further comprising:
determining a set of constellation point offsets between a set of default constellation points and the set of constellation distortion points of the constellation distribution associated with the modulation scheme based at least in part on the indication; and
determining the set of constellation points for the set of constellation distortion points of the constellation distribution based at least in part on the set of constellation point offsets,
wherein performing the digital post distortion operation is based at least in part on determining of the set of constellation points for the set of constellation distortion points of the constellation distribution.

10. The method of claim 1, wherein the set of constellation points for the set of constellation distortion points of the constellation distribution corresponds to a set of edge constellation points of the constellation distribution.

11. The method of claim 1, wherein the set of constellation points for the set of constellation distortion points of the constellation distribution corresponds to a set of radiuses of constellation points of the constellation distribution.

12. The method of claim 1, wherein the modulation scheme comprises quadrature amplitude modulation or amplitude and phase-shift keying modulation.

13. The method of claim 1, wherein the wireless communication comprises a single carrier waveform transmission.

14. A method for wireless communication at a base station, comprising:
determining a set of constellation points for a set of constellation distortion points, the set of constellation distortion points of a constellation distribution associated with a modulation scheme; and
transmitting control signaling comprising an indication of the set of constellation points for the set of constellation distortion points.

15. The method of claim 14, wherein transmitting the control signaling comprises:
transmitting a downlink control information message comprising the indication of the set of constellation points for the set of constellation distortion points of the constellation distribution associated with the modulation scheme.

16. The method of claim 14, wherein transmitting the control signaling comprises:
transmitting one or more of a radio resource control message or a medium access control-control element comprising a configuration of a table comprising an entry of the set of constellation distortion points of the constellation distribution associated with the modulation scheme.

17. The method of claim 14, wherein transmitting the control signaling comprises:
transmitting a radio resource control message comprising the indication of the set of constellation points for the set of constellation distortion points of the constellation distribution associated with the modulation scheme.

18. The method of claim 14, wherein transmitting the control signaling comprises:
transmitting a medium access control-control element comprising the indication of the set of constellation points for the set of constellation distortion points of the constellation distribution associated with the modulation scheme.

19. The method of claim 14, wherein transmitting the control signaling comprising the indication of the set of constellation points for the set of constellation distortion points of the constellation distribution associated with the modulation scheme is based at least in part on a power amplifier compression level associated with the base station.

20. The method of claim 14, further comprising:
determining a set of constellation point offsets between a set of default constellation points and the set of constellation distortion points of the constellation distribution associated with the modulation scheme, the indication indicates the set of constellation point offsets, wherein transmitting the control signaling comprises:
transmitting control signaling comprising the indication of the set of constellation points and the set of constellation point offsets for the set of constellation distortion points of the constellation distribution associated with the modulation scheme.

21. The method of claim 14, wherein the set of constellation points for the set of constellation distortion points of the constellation distribution corresponds to a set of edge constellation points of the constellation distribution.

22. The method of claim 14, wherein the set of constellation points for the set of constellation distortion points of the constellation distribution corresponds to a set of radiuses of constellation points of the constellation distribution.

23. The method of claim 14, wherein the modulation scheme comprises quadrature amplitude modulation or amplitude and phase-shift keying modulation.

24. The method of claim 14, wherein the wireless communication comprises a single carrier waveform transmission.

25. An apparatus for wireless communication at a user equipment (UE), comprising:
a processor;
memory coupled with the processor; and
instructions stored in the memory and executable by the processor to cause the apparatus to:
receive control signaling comprising an indication of a set of constellation points for a set of constellation distortion points, the set of constellation distortion points of a constellation distribution associated with a modulation scheme;
perform a digital post distortion operation based at least in part on the set of constellation points for the set of constellation distortion points of the constellation distribution; and
decode the wireless communication based at least in part on performing of the digital post distortion operation.

26. The apparatus of claim 25, wherein the instructions to perform the digital post distortion operation are executable by the processor to cause the apparatus to:
estimate a nonlinearity error of a power amplifier based at least in part on the set of constellation points for the set of constellation distortion points of the constellation distribution,
wherein the instructions to decode the wireless communication are executable by the processor based at least in part on the nonlinearity error of the power amplifier.

27. The apparatus of claim 25, wherein the instructions to receive the control signaling are executable by the processor to cause the apparatus to:
receive a downlink control information message comprising the indication of the set of constellation points for the set of constellation distortion points of the constellation distribution associated with the modulation scheme.

28. The apparatus of claim 27, wherein the instructions are further executable by the processor to cause the apparatus to:
determine an entry of a table that corresponds to the set of constellation distortion points of the constellation distribution associated with the modulation scheme based at least in part on the downlink control information message,
wherein perform the digital post distortion operation is based at least in part on determining the entry of the table that corresponds to the set of constellation distortion points of the constellation distribution associated with the modulation scheme.

29. An apparatus for wireless communication at a base station, comprising:
a processor;
memory coupled with the processor; and
instructions stored in the memory and executable by the processor to cause the apparatus to:
determine a set of constellation points for a set of constellation distortion points, the set of constellation distortion points of a constellation distribution associated with a modulation scheme; and
transmit control signaling comprising an indication of the set of constellation points for the set of constellation distortion points.

30. The apparatus of claim 29, wherein the instructions to transmit the control signaling are executable by the processor to cause the apparatus to:
transmit a downlink control information message comprising the indication of the set of constellation points for the set of constellation distortion points of the constellation distribution associated with the modulation scheme.

* * * * *